US007672863B2

(12) United States Patent
Kurosawa et al.

(10) Patent No.: US 7,672,863 B2
(45) Date of Patent: Mar. 2, 2010

(54) SYSTEM AND METHOD FOR LOAD BALANCING BASED ON SERVICE LEVEL OBJECTIVES AND INFORMATION ON THE CONTENTS OF START AND FINISH PROCESSES OF BUSINESS SERVICES

(75) Inventors: Masahiro Kurosawa, Yokohama (JP); Yusuke Noda, Ninomiya (JP); Tomomi Suzuki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 1399 days.

(21) Appl. No.: 10/720,758

(22) Filed: Nov. 25, 2003

(65) Prior Publication Data

US 2004/0193674 A1    Sep. 30, 2004

(30) Foreign Application Priority Data

Mar. 31, 2003 (JP) .............................. 2003-095659

(51) Int. Cl.
*G05B 19/418* (2006.01)
(52) U.S. Cl. ......................................................... 705/8
(58) Field of Classification Search ...................... 705/8
See application file for complete search history.

(56) References Cited

U.S. PATENT DOCUMENTS

| 5,537,542 | A |   | 7/1996 | Eilert et al. |
| 5,603,029 | A | * | 2/1997 | Aman et al. ................. 718/105 |
| 6,041,354 | A | * | 3/2000 | Biliris et al. ................. 709/226 |
| 6,226,377 | B1 | * | 5/2001 | Donaghue, Jr. ........ 379/265.13 |
| 6,335,927 | B1 | * | 1/2002 | Elliott et al. ................. 370/352 |
| 6,393,455 | B1 | * | 5/2002 | Eilert et al. .................. 718/105 |
| 6,437,804 | B1 | * | 8/2002 | Ibe et al. ..................... 715/736 |
| 6,446,200 | B1 | * | 9/2002 | Ball et al. ...................... 713/1 |
| 6,578,005 | B1 | * | 6/2003 | Lesaint et al. ................... 705/8 |

(Continued)

FOREIGN PATENT DOCUMENTS

JP    P2002-163241    6/2002

(Continued)

OTHER PUBLICATIONS

Hall, Jason et al., Satisfying QoS with a Learning Based Scheduling Algorithm IEEE 1998.*

(Continued)

*Primary Examiner*—Scott L Jarrett
(74) *Attorney, Agent, or Firm*—McDermott Will & Emery LLP

(57) ABSTRACT

A load balancing method comprises the steps of: registering a business configuration definition of each business service including a schedule of the business service with a business configuration management repository; storing at least a service level objective of each business service; storing information on performance of each information processing module; acquiring the registered schedule and the stored service level objective of the designated business service; partitioning the schedule of the designated business service into a plurality of partial schedules according to the acquired service level objective; selecting one or more information processing modules whose performance information stored in the performance management table satisfies the service level objective in each partial schedule; and reserving the information processing modules selected for the partial schedules as information processing modules for executing the designated business service in the schedule. A partition fulfilling agreements on service quality can be constructed dynamically.

17 Claims, 33 Drawing Sheets

U.S. PATENT DOCUMENTS

| | | | |
|---|---|---|---|
| 6,606,529 B1* | 8/2003 | Crowder et al. | 700/100 |
| 6,823,382 B2* | 11/2004 | Stone | 709/224 |
| 6,877,035 B2* | 4/2005 | Shahabuddin et al. | 709/226 |
| 6,901,592 B2* | 5/2005 | Mar et al. | 718/102 |
| 6,910,024 B2* | 6/2005 | Krishnamurthy et al. | 705/400 |
| 7,062,559 B2* | 6/2006 | Yoshimura et al. | 709/226 |
| 7,093,004 B2* | 8/2006 | Bernardin et al. | 709/219 |
| 7,213,065 B2* | 5/2007 | Watt | 709/223 |
| 7,243,351 B2* | 7/2007 | Kundu | 718/102 |
| 7,412,532 B2* | 8/2008 | Gondhalekar et al. | 709/231 |
| 2002/0087694 A1* | 7/2002 | Daoud et al. | 709/226 |
| 2002/0099901 A1 | 7/2002 | Tanaka et al. | |
| 2003/0140126 A1* | 7/2003 | Budhiraja et al. | 709/220 |

FOREIGN PATENT DOCUMENTS

JP  P2002-222110  8/2002

OTHER PUBLICATIONS

Foster, Ian et al., A Distributed Resource Management Architecture that Supports Advance Researvations and Co-Allocation Proceedings of the International Workshop of Quality of Service, 1999.*

Keller, Alexander et al., Defining and Monitoring Service Level Agreements for dynamic e-Business Proceedings of the 16$^{th}$ System Administration Conference, 2002.*

Sahai, Akhil et al., Automated SLA Monitoring for Web Services IEEE/IFIP DSOM, Oct. 2002.*

Czajkowski, Karl et al., SNAP: A Protocol for Negotiating Service Level Agreements and Coordinating Management in Distributed Systems, JSSPP 2002, LNCS 2537, pp. 153-183, 2002.*

ProvisionSoft Certifies Emulex HBAs for Use With Its DynamicIT Software Solution Business Wire, Feb. 25, 2003.*

Peakstone and Alteaon Team to Provide Breakthrough Internet Service Assurance PR Newswire, May 31, 2000.*

Bhinder, Ramandeep, Design and Evaluation of Request Distribution Schemes for Web-Server Clusters University of Manitoba, 2002.*

Techland Group: SysMaster network performance optimisation suite allows NOCs to do more with less PR Newswite, Sep. 20, 2002.*

Wu, Na, QoS-Driven Routing and Resouce Scheduling in Wired and Wireless Networks McGill University, Feb. 1999.*

Venkatasubramanian, Nalini, An Adaptive Resource Management Architecture for Global Distributed Computing University of Illinois at Urbana-Champaign, 1998.*

* cited by examiner

FIG. 6

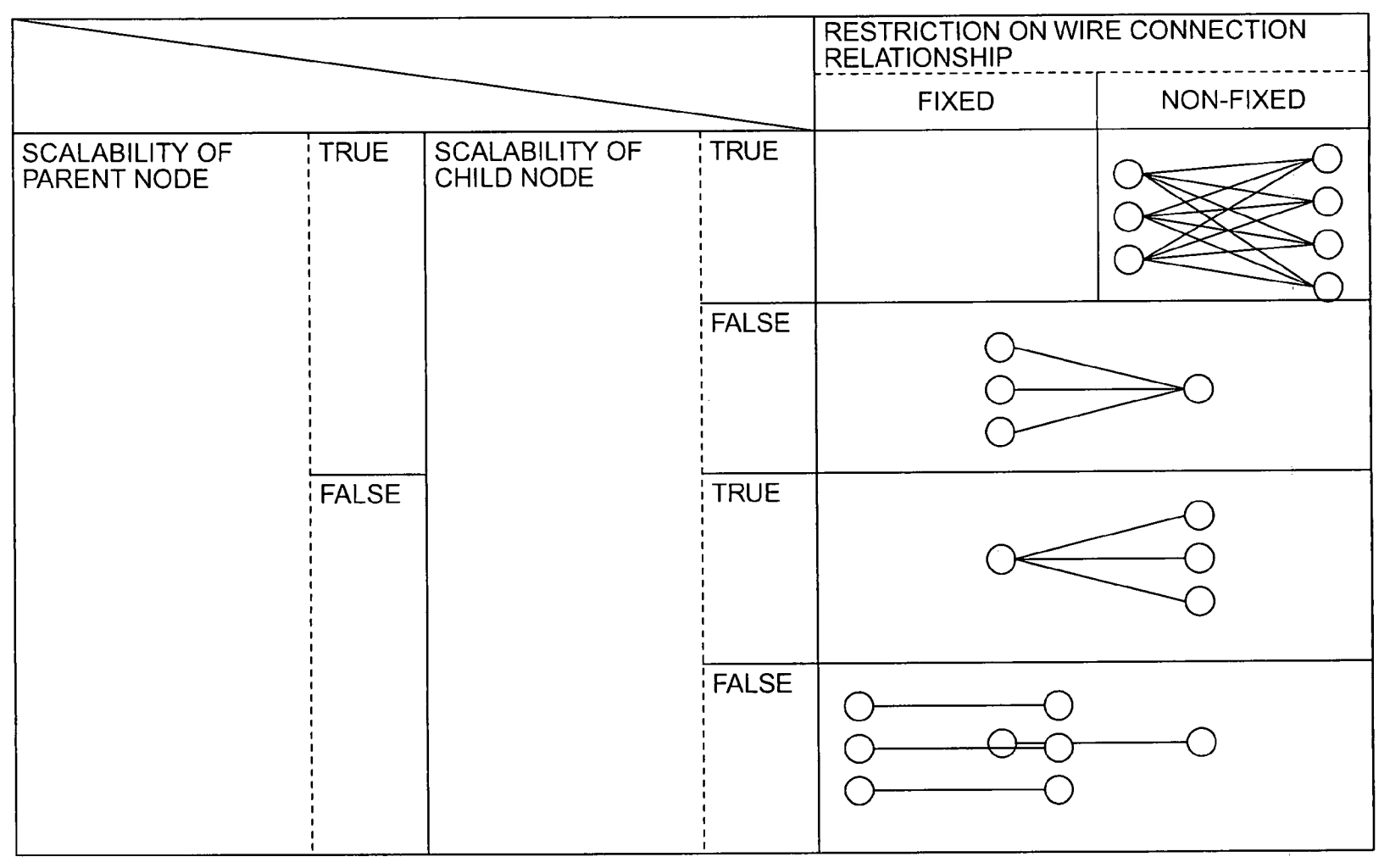

| SCALABILITY OF PARENT NODE | | SCALABILITY OF CHILD NODE | | RESTRICTION ON WIRE CONNECTION RELATIONSHIP | |
|---|---|---|---|---|---|
| | | | | FIXED | NON-FIXED |
| TRUE | | TRUE | | | ◯◯◯◯ / ◯◯◯ (non-fixed diagram) |
| TRUE | | FALSE | | ◯ / ◯◯◯ | |
| FALSE | | TRUE | | ◯◯◯ / ◯ | |
| FALSE | | FALSE | | ◯ ◯ ◯ / ◯ ◯ ◯ / ◯ ◯ ◯ | |

FIG. 7

```
<logical_structure>
   <unique_id>0001 </unique_id>
   <node>
      <node_id>n001 </node_id>
      <use>Web</use>
      <scalability>true</scalability>
   </node>
   <node>
      <node_id>n002</node_id>
      <use>EJB</use>
      <scalability>true</scalability>
   </node>
   <node>
      <node_id>n003</node_id>
      <use>DB</use>
      <scal ability>false</scalability>
   </node>
   <connection>
      <connection_id>c001</connection_id>
      <parent>n001</parent>
      <child>n002</child>
      <restriction>fix</restriction>
   </connection>
   <connection>
      <connection_id>c002</connection_id>
      <parent>n002</parent>
      <child>n003</child>
   </connection>
</logical_structure>
```

451d START TIME SCRIPT

| STEP 451d1 | PROCESS TARGET 451d2 | PROCESS CONTENTS 451d3 | OMISSION JUDGMENT FLAG 451d4 | CORRESPONDING FINISH TIME STEP 451d5 |
|---|---|---|---|---|
| S001 | Web | EXECUTE "WEB SERVER DEFINITION #1" | WEB SERVER DEFINITION #1 EXECUTION COMPLETION FLAG | T004 |
| S002 | DB | EXECUTE "DB DEFINITION #1" | DB DEFINITION #1 EXECUTION COMPLETION FLAG | T003 |
| S003 | EJB | INSTALL "EJB CONTAINER #1" | EJB CONTAINER #1 INSTALLATION COMPLETION FLAG | T002 |
| S004 | WHOLE | ADJUST LB | — | T001 |
| .. | .. | .. | .. | .. |

451e FINISH TIME SCRIPT

| STEP 451e1 | PROCESS TARGET 451e2 | PROCESS CONTENTS 451e3 | OMISSION JUDGMENT FLAG 451e4 | CORRESPONDING START TIME STEP 451e5 |
|---|---|---|---|---|
| T001 | WHOLE | ADJUST LB | — | S004 |
| T002 | EJB | UNINSTALL "EJB CONTAINER #1" | EJB CONTAINER #1 UNINSTALLATION COMPLETION FLAG | S003 |
| T003 | DB | DELETE "DB DEFINITION #1" | DB DEFINITION #1 DELETION COMPLETION FLAG | S002 |
| T004 | Web | DELETE "WEB SERVER DEFINITION #1" | WEB SERVER DEFINITION #1 DELETION COMPLETION FLAG | S001 |
| .. | .. | .. | .. | .. |

START TIME SCRIPT

| STEP | PROCESS TARGET | PROCESS CONTENTS | OMISSION JUDGMENT FLAG 451d6 | CORRESPONDING FINISH TIME STEP |
|---|---|---|---|---|
| S001 | Web | INSTALL HTTP SERVER SOFTWARE #1 | HTTP SERVER SOFTWARE #1 INSTALLATION COMPLETION FLAG | T022 |
| S002 | Web | SET VIRTUAL DIRECTORY BASED ON VIRTUAL DIRECTORY SETTING #1 | VIRTUAL DIRECTORY SETTING #1 COMPLETION FLAG | T021 |
| S003 | Web | SET TCP PORT BASED ON TCP PORT SETTING #1 | TCP PORT SETTING #1 COMPLETION FLAG | T020 |
| .. | .. | .. | .. | .. |

FINISH TIME SCRIPT

| STEP | PROCESS TARGET | PROCESS CONTENTS | OMISSION JUDGMENT FLAG | FINISH PROCESS OMISSION 451e6 | CORRESPONDING START TIME STEP |
|---|---|---|---|---|---|
| T001 | DB | INITIALIZE TABLE | INITIAL VALUE #1 FLAG | STEP NOT OMITTED: T002 | S022 |
| T002 | DB | DELETE TABLE AND INDEX OF SCHEMA #1 | SCHEMA #1 DELETION FLAG | UNCONDITIONAL | S021 |
| T003 | DB | UNINSTALL DBMS SOFTWARE #1 | DBMS SOFTWARE #1 UNINSTALLATION COMPLETION FLAG | NO FLAG: DBMS SOFTWARE*INSTALLATION FLAG | S020 |
| .. | .. | .. | .. | .. | .. |

FIG. 24

| | | | | RESERVATION CANDIDATE | | | |
|---|---|---|---|---|---|---|---|
| | | | | 1 | 2 | 3 | ... |
| 133b — INDEX 133b | 1 | | ▷ | | | | |
| | 2 | | ▷ | | | | |
| | 3 | | ▷ | | | | |
| | : | | ▷ | | | | |
| | m | | ▷ | | | | |
| 133c — RELATIONSHIP WITH IMMEDIATELY PRECEDING RESERVATION 133c | SUM OF TIME BETWEEN FINISH TIME OF IMMEDIATELY PRECEDING RESERVATION AND START TIME OF RESERVATION REQUEST TIME | | ▷ | | | | | — 133c1
| | RATIO OF LOGICAL SERVERS CAPABLE OF OMITTING START PROCESS (TO TOTAL NUMBER) | | ▷ | | | | | — 133c2
| | RATIO OF LOGICAL SERVERS CAPABLE OF TOTALLY OMITTING FINISH PROCESS OF IMMEDIATELY PRECEDING RESERVATION AND START PROCESS OF THE TENTATIVE RESERVATION (TO TOTAL NUMBER) | | ▷ | | | | | — 133c3
| 133d — RELATIONSHIP WITH IMMEDIATELY FOLLOWING RESERVATION 133d | SUM OF TIME BETWEEN FINISH TIME OF RESERVATION REQUEST TIME AND START TIME OF IMMEDIATELY FOLLOWING RESERVATION | | ▷ | | | | | — 133c1
| | RATIO OF LOGICAL SERVERS CAPABLE OF OMITTING FINISH PROCESS (TO TOTAL NUMBER) | | ▷ | | | | | — 133d2
| | RATIO OF LOGICAL SERVERS CAPABLE OF TOTALLY OMITTING START PROCESS OF IMMEDIATELY FOLLOWING RESERVATION AND FINISH PROCESS OF THE TENTATIVE RESERVATION (TO TOTAL NUMBER) | | ▷ | | | | | — 133d3
| 133f — RELATIONSHIP WITH PRECEDING/FOLLOWING RESERVATIONS 133F | AVERAGE OF 133C1 AND 133d1 | | ▷ | | | | | — 133f1
| | AVERAGE OF 133C2 AND 133d2 | | ▷ | | | | | — 133f2
| | AVERAGE OF 133C3 AND 133d3 | | ▷ | | | | | — 133f3
| 133g — TOTAL COST 133g | | | ▷ | | | | |
| | PURPOSE COINCIDENCE RATIO 133e | | ▷ | | | | |

133e
PURPOSE COINCIDENCE RATIO 133e
SORT BUTTON

133

SYSTEM AND METHOD FOR LOAD BALANCING BASED ON SERVICE LEVEL OBJECTIVES AND INFORMATION ON THE CONTENTS OF START AND FINISH PROCESSES OF BUSINESS SERVICES

BACKGROUND OF THE INVENTION

The present invention relates to a load balancing system for carrying out load balancing or load distribution by dynamic assignment of a plurality of information processors.

In a system built up by combining a plurality of information processors, if large numbers of process requests concentrate in a particular information processor, an upsurge of the load on the information processor might cause serious extension of response time or total loss of processing power of the whole system, and consequently, the service quality of the system is necessitated to be deteriorated. Here, the term "service" means the execution of a requested process by an information processor or a system including information processors. The "service quality" means measurable performance of an information processor or a system including information processors, such as response time, throughput (the number of requests processed in unit time), and so forth.

Some countermeasures against the above problem have been taken in conventional systems including a plurality of information processors. For example, an appropriate number of information processors are clustered into an apparently single information processor and requests from a requesting information processor (requesting the system to process the requests) are assigned and distributed by a load distribution device to the information processors of the apparently single information processor, enabling the system to process larger numbers of requests and improve its service quality.

However, even in the above method, when the system receives extremely large numbers of process requests in a particular time period, an extremely heavy load is put on every information processor of the system and consequently, the service quality deteriorates. The problem can be solved if a sufficient number of information processors (capable of coping with the maximum load) can be prepared; however, if the number of requests is not that large except in the particular time period, many of the information processors prepared for the maximum load become redundant and wasteful most of the time.

There has been proposed a method for resolving the above problem, in which extra information processors (standby information processors) for executing extra processes are added to the system when the load on the system exceeds the processing power of existing information processors. On the other hand, when the processing power of the existing information processors becomes too high, redundant information processors are removed from the system.

However, in the above method, which aims to automatically add the standby information processors to the system according to the change in the number of process requests without using manpower, the standby information processors are assumed to wait in readiness with programs (for the service) and information (to be used by the program) already loaded and stored therein. In short, the method is not capable of resolving the problem of having to reserve many standby information processors (which are unnecessary at ordinary times) only to cope with the maximum load.

Especially, in data centers as business for comprehensively providing customers with information processors, power sources, installation spaces, air conditioning, administrative work, etc., each customer is provided with a fixed partition (a set of information processors) so that contracts with the customer such as SLA (Service Level Agreements) will be fulfilled, and even in cases where the load changes depending on the time of day, a large-scale partition capable of coping with the maximum load has to be prepared for each customer. Such a situation is disadvantageous to the data center (having to manage large numbers of information processors) from the viewpoint of management cost, and is also disadvantageous to each user or customer in that an expensive fee has to be paid even if the information processors are used for only a short time.

SUMMARY OF THE INVENTION

As described above, in conventional systems built up by combining a plurality of information processors, concentration of large numbers of process requests in a particular information processor cause an upsurge of the load on the information processor and thereby the service quality of the system is deteriorated. In the case where a sufficient number of information processors capable of coping with the maximum load are prepared in order to resolve the problem, many information processors (which are unnecessary at ordinary times) have to be reserved only for coping with the maximum load, causing a high management cost for managing large numbers of information processors and an expensive fee for using the information processors only for a short time.

It is therefore the object of the present invention to provide a technique by which information processors that have become idle depending on the type of business and the time of day can be assigned to other services of business.

In a load balancing system (for carrying out load balancing or load distribution by dynamic assignment of a plurality of information processors depending on variations in the process requests) in accordance to the present invention, the load balancing of service is realized by partitioning a schedule of a designated service into a plurality of partial schedules based on SLOs (Service Level Objectives: target values for fulfilling agreements on service quality) and assigning each of the partial schedules information processors that satisfy the SLOs in the partial schedule.

In a load balancing system according to an aspect of the present invention, for each service which is carried out using a system including a plurality of information processors, an input of a "business configuration definition" (including "logical structure" indicating the logical system configuration of the service, "scripts" describing steps to be executed at the start time and finish time of the service) is received, and the inputted business configuration definition of each service is registered with a business configuration management repository.

Meanwhile, the SLOs of each service are registered with an SLO management table.

Further, performance measurement results obtained by assigning actual information processors to the logical structure are inputted, and the performance measurement results are previously registered with a performance management table as information indicating the performance of each information processor.

After receiving designation of a service (as the target of the logical server assignment), the schedule of the designated service is read from the business configuration definition registered with the business configuration management repository, and the SLOs of the designated service is acquired from the SLO management table.

Subsequently, the schedule of the designated service (read from the business configuration definition) is partitioned into a plurality of partial schedules according to the acquired SLOs. One or more information processors whose performance information stored in the performance management table satisfies the SLOs in each partial schedule are selected, and the information processors selected for the partial schedules are reserved as information processors for executing the designated service in the schedule.

For example, information on response time in each time period and information on throughput in each time period (which have been designated as the SLOs) are overlaid on each other, and the schedule of the designated service is partitioned in units of spans in each of which both the response time and throughput remain constant. Thereafter, the performance management table is referred to and information processors capable of attaining the response time and throughput in the partial schedule are selected and reserved as information processors for executing the designated service.

As explained above, the load balancing system of the present invention carries out the load balancing of service by partitioning the schedule of the designated service into a plurality of partial schedules based on the SLOs and assigning each of the partial schedules information processors that satisfy the SLOs, by which it becomes possible to dynamically construct an optimum partition (set of information processors) fulfilling the agreements on service quality and assign information processors that have become idle (depending on the time of day) to other services.

In the reservation of each information processor for executing the designated service in accordance with the present invention, it is also possible to refer to the scripts (describing steps to be executed at the start time and the finish time) of the designated service and the scripts of a service that has already been reserved with the information processor and make the reservation omitting coinciding (redundant) steps. By the omission of the coinciding steps, time necessary for executing the service can be shortened. Thus, even when the reservation of the whole service including the steps executed at the start time and the finish time is impossible, the reservation of the service (from which the redundant steps have been omitted) becomes possible in some cases, by which the probability of the assignment of services to idle time of information processors can be increased.

Up to now, a system including a plurality of information processors for executing a service is generally constructed based on knowledge and experience and consulting of the manager or administrator with the user or customer. By the present invention, the system is constructed automatically based on indices regarding previously measured performance, by which the user is allowed to design the system for executing the service without the need of considering actual information processors. Meanwhile, the manager is allowed to construct such systems more efficiently.

As above, by the load balancing system in accordance with the present invention which carries out the load balancing of service by assigning each of the partial schedules (obtained by partitioning the schedule of the designated service based on the SLOs) information processors that satisfy the SLOs, it becomes possible to dynamically construct partitions fulfilling the agreements on service quality and assign idle information processors (that have become idle depending on the type of business and the time of day) to other services of business.

BRIEF DESCRIPTION OF THE DRAWINGS

The objects and features of the present invention will become more apparent from the consideration of the following detailed description taken in conjunction with the accompanying drawings, in which:

FIG. 6 is a table showing the details of configuration restriction employed in the embodiment;

FIG. 7 is a schematic diagram showing concrete examples of "logical structure" and the configuration restriction of the embodiment;

FIG. 8 is a schematic diagram showing the details of a start time script and a finish time script of the embodiment;

FIG. 22 is a schematic diagram showing another example of the details of the start time script and the finish time script of the embodiment, in which "finish process omission" is added to the finish time script;

FIG. 24 is a schematic diagram showing the details of selection from reservation candidates (S8200) of the embodiment;

DESCRIPTION OF THE EMBODIMENTS

Figure 1:
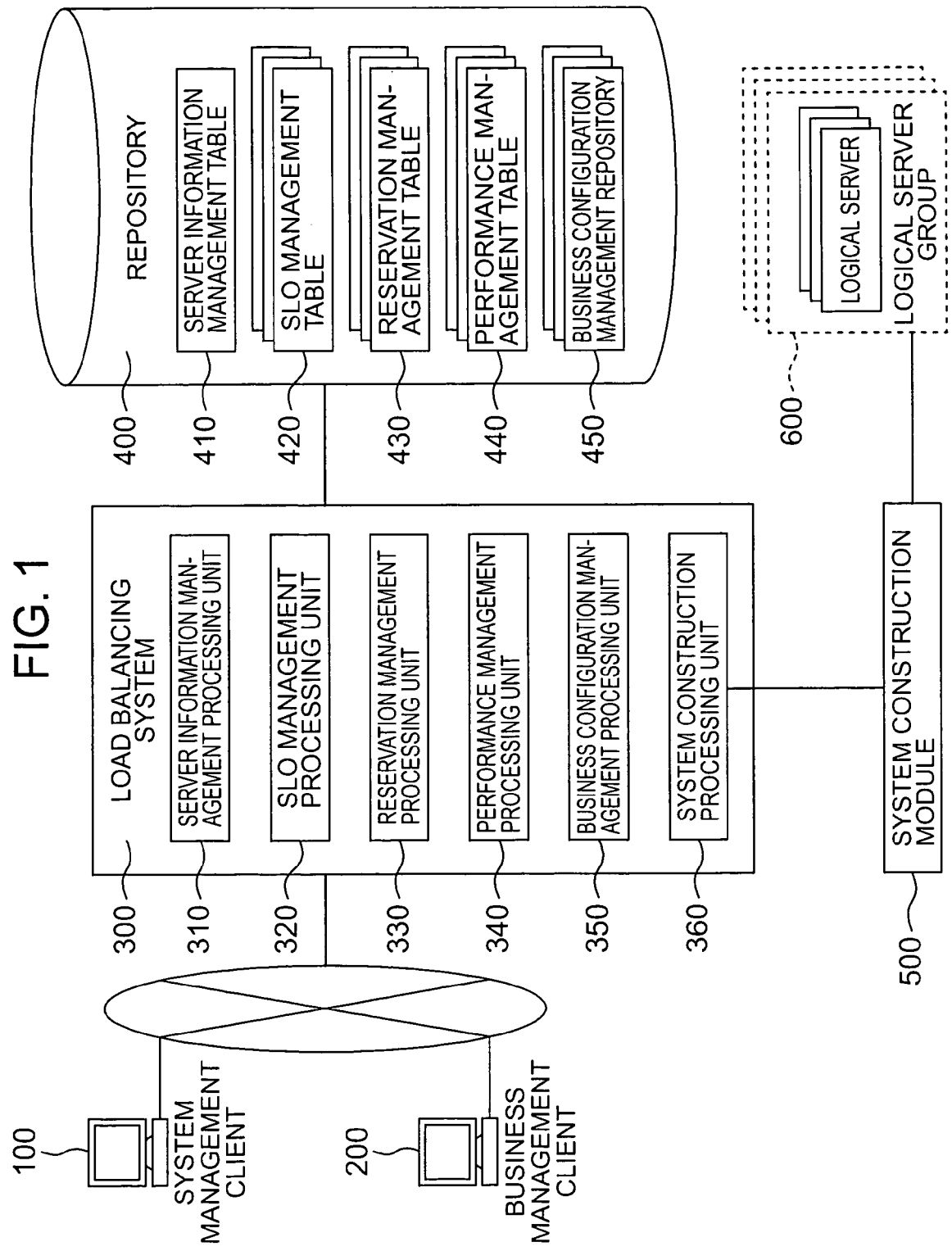
FIG. 1 is a schematic block diagram showing the overall composition of a load balancing system in accordance with an embodiment of the present invention.

Referring now to the drawings, a description will be given in detail of a load balancing system in accordance with an embodiment of the present invention, which carries out load balancing or load distribution by dynamic assignment of a plurality of information processors depending on variations in the process requests.

FIG. 1 is a schematic block diagram showing the overall composition of a load balancing system 300 in accordance with the embodiment of the present invention. The load balancing system 300 shown in FIG. 1 includes a server information management processing unit 310, an SLO (Service Level Objective) management processing unit 320, a reservation management processing unit 330, a performance management processing unit 340, a business configuration management processing unit 350, and a system construction processing unit 360.

Hereinafter, a term "business service" will also be used for meaning "service", and elements of a system carrying out a service will be called "logical servers". Each logical server may be implemented by: a physically existing information processor; a program or object capable of executing the process of the information processor; or a segment obtained by virtually segmenting an information processor by a technique such as LPAR.

The server information management processing unit 310 is a processing unit which receives inputs regarding information on each logical server (purpose, cost, additional information, etc.) and registers the server information with a server information management table 410.

The SLO management processing unit 320 is a processing unit which receives inputs regarding target values (SLOs (Service Level Objectives)) of each business service in each time period (response time, throughput (the number of requests to be processed in unit time), etc.) as conditions for fulfilling contracts or agreements made with the user of the business service and registers the SLOs with an SLO management table 420.

The business configuration management processing unit 350 is a processing unit which receives inputs regarding the definition of each business service ("logical structure" indicating logical system configuration of the business service, operational schedule (start time, finish time, etc.) of the business service, start time script and finish time script of the business service, etc.) and registers the business configuration definition (451) with a business configuration management repository 450.

The performance management processing unit 340 is a processing unit which receives inputs regarding performance (measurement results on response time, throughput, etc. when an actual logical server group is assigned to the aforementioned logical system configuration of each business service) and registers the performance information with a performance management table 440.

The reservation management processing unit 330 is a processing unit which reads the schedule of a designated business service from the business configuration definition 451 which has been stored in the business configuration management repository 450, acquires the SLOs of the designated business service from the SLO management table 420, partitions the schedule of the designated business service into a plurality of partial schedules according to the acquired SLOs, and reserves proper logical servers (whose performance information stored in the performance management table 440 fulfills the SLOs in each partial schedule) as information processors for carrying out the designated business service in the partial schedule.

The system construction processing unit 360 is a processing unit which issues instructions on system construction/release to a system construction module 500 according to the contents of the reservation made by the reservation management processing unit 330.

A program stored in a record medium such as a CD-ROM, for letting the load balancing system 300 function as the processing units 310, 320, 330, 340, 350 and 360, is supplied to the system, stored in a storage of the system such as a magnetic disk unit, and then loaded on memory of the system to be executed. The type of the record medium for storing the program is not limited to CD-ROM. While the program can be used by directly installing the program in an information processor from the record medium, it is also possible to use the program by making access to the program through a network.

The "logical server group 600" shown in FIG. 1 means a set of one or more logical servers of the same performance to be used for the same purpose or for the same combination of purposes.

Figure 2:
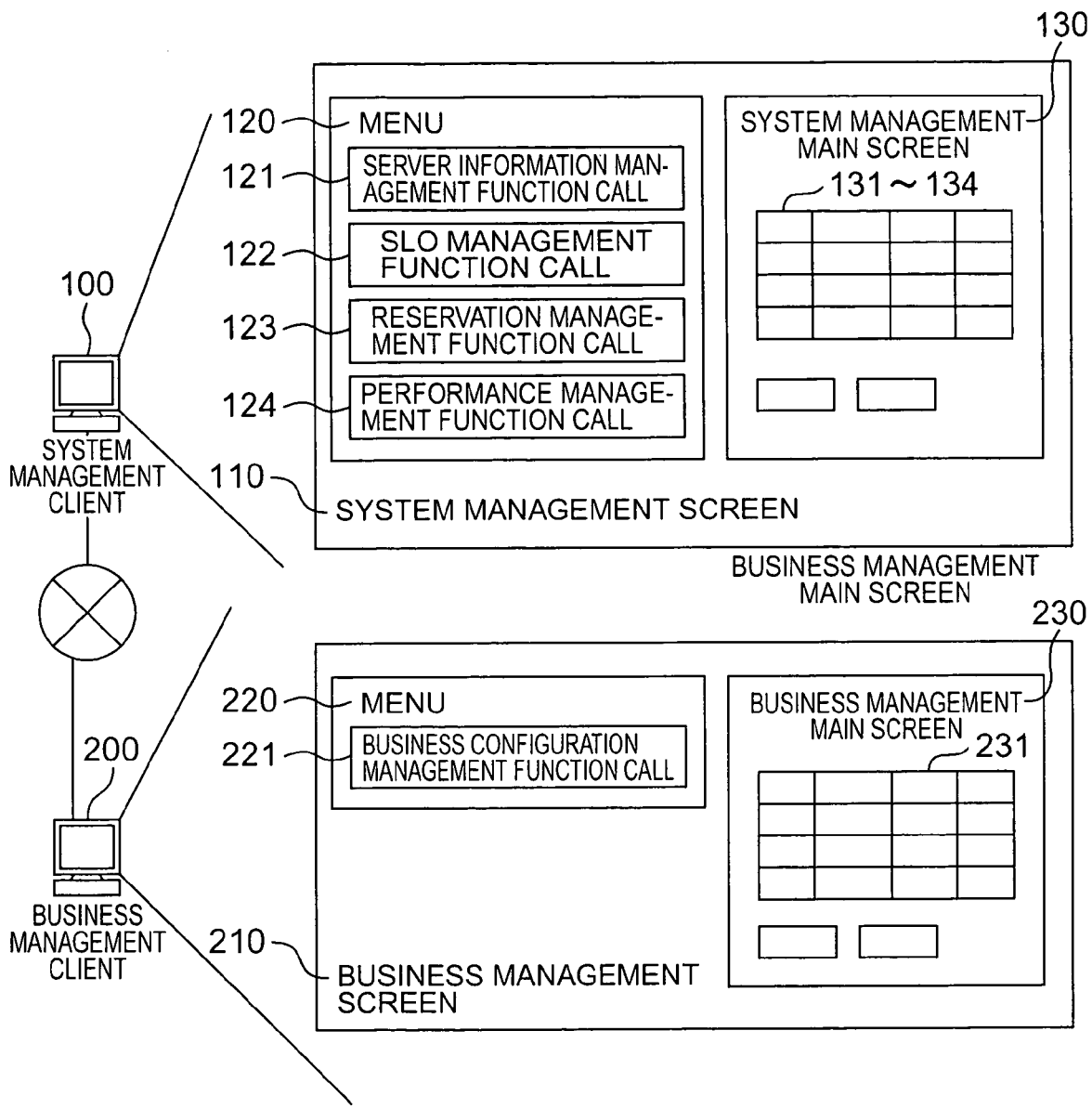
FIG. 2 is a schematic diagram showing examples of screens displayed by a system management client and a business management client of the embodiment.

FIG. 2 is a schematic diagram showing examples of screens which are displayed by a system management client 100 and a business management client 200 of this embodiment. The system management client 100 and the business management client 200 shown in FIG. 2 are information processors having the function of calling up a system management screen 110 and a business management screen 210 respectively. Each management client (100, 200) carries out a process for displaying each management screen (110, 210) on its display.

The system management screen 110 displays a menu 120 including several items (server information management function call 121, SLO management function call 122, reservation management function call 123, and performance management function call 124), lets the user select from the menu items with an input device (mouse, etc.), and displays a screen corresponding to the selection (server information management screen 131, SLO management screen 132, reservation management screen 133, or performance management screen 134) for letting the user use the functions of a corresponding processing unit (server information management processing unit 310, SLO management processing unit 320, reservation management processing unit 330, or performance management processing unit 340).

Meanwhile, the business management screen 210 displays a menu 220 including an item (business configuration management function call 221), lets the user select the menu item with an input device (mouse, etc.), and displays a business configuration management screen 231 for letting the user use the functions of the business configuration management processing unit 350.

The system management client 100 and the business management client 200 may also be implemented as a single information processor as long as the information processor can call up the system management screen 110 and the business management screen 210. In this case, the system management screen 110 and the business management screen 210 may also be displayed together in one screen. Hereinafter, the user of the system management screen 110 will be called "system manager" and the user of the business management screen 210 will be called "business manager"; however, of course there may be cases where a person serves as both a system manager and a business manager.

Figure 3:
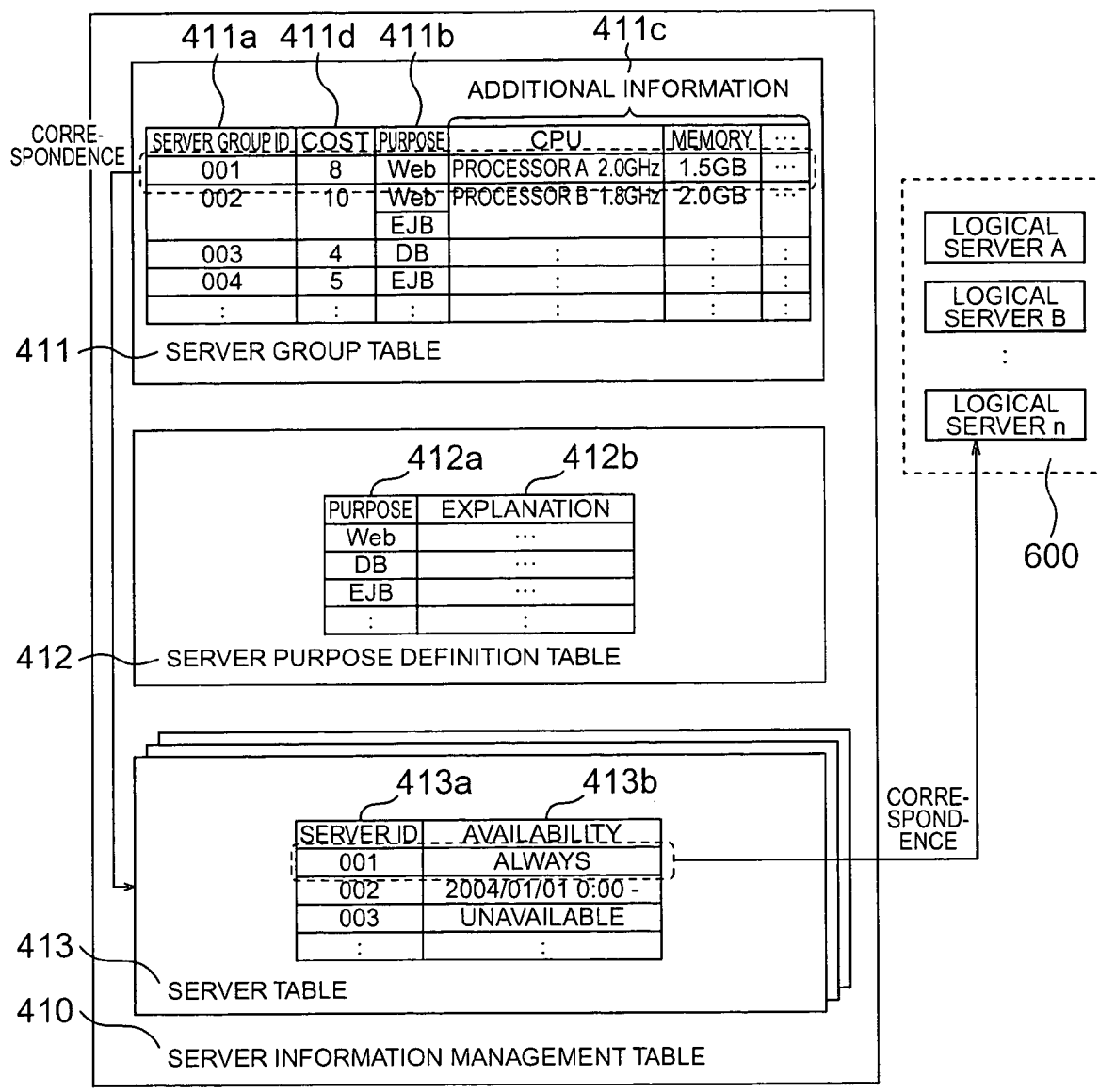
FIG. 3 is a schematic diagram showing the details of a server information management table of the embodiment.

FIG. 3 is a schematic diagram showing the details of the server information management table 410 employed in this embodiment. The server information management processing unit 310 receives inputs regarding information on logical servers for executing each business service (purpose, cost, additional information etc.) and registers the server information with the server information management table 410.

The server information management table 410 shown in FIG. 3 includes a server group table 411, a server purpose definition table 412, and a server table 413. Each table (411, 412, 413) is typically expressed as a table of a relational database; however, other expressions (e.g. data file according to the XML (eXtensible Markup Language) format) are also possible (ditto for other tables employed in this embodiment).

In the server information management table 410, the information on one server corresponds to one record (line) in the server table 413, and one record (line) in the server group table 411 corresponds to one server table 413.

The "server group ID 411*a*" shown in the server group table 411 is an identification number which is assigned by the server information management processing unit 310 to a record newly added to the server group table 411 so that the record can be uniquely identified in the table.

The "purpose 411*b*" indicates the purpose of each logical server group held in each record, for which only the purposes described in "purpose 412*a*" of the server purpose definition table 412 can be selected and designated (In the case where the server group table 411 is expressed as a table of a relational database, the purpose 411*b* is a foreign key, and its parent key is the purpose 412*a* in the server purpose definition table 412.). It is also possible to assign two or more purposes 411*b* to one server group ID 411*a*; however, assigning the same two purposes at the same time is not allowed (In the case where the server group table 411 is expressed as a table of a relational database, the server group ID 411*a* and the purpose 412*a* are primary keys.). The "Web", "EJB (Enterprise JavaBeans)" (registered trademark), or "DB (DataBase)" in FIG. 3 means that the logical servers of the logical server group are used for a business service that employs Web page, EJB, or DB.

The "cost 411*d*" indicates the cost of each logical server group held in each record of the server group table 411. Since the reservation management processing unit 330 evaluates the cost 411*d* by relative evaluation, the figure designated in the cost 411*d* may either be a real figure or a virtual figure.

The "additional information 411*c*" indicates other information on each logical server group held in each record. The additional information 411*c* is set by the system manager in order to identify each logical server group more easily. The additional information 411*c* may include any information regarding logical server performance as long as it can be quantified. Thus, in addition to the CPU clock frequency and memory capacity shown in FIG. 3, HDD revolving speed, buffer memory capacity, the capacity and bus width of primary/secondary cache of the CPU, I/O transfer rate of memory, etc. can be included in the additional information 411*c*.

Each record of the server purpose definition table 412 holds the definition of each purpose (In the case where the server group table 411 is expressed as a table of a relational database, the purpose 412*a* is a primary key.). The "explanation 412*b*" indicates an explanation of each purpose held in each record. The explanation 412*b* is set by the system manager in order to identify each purpose more easily.

The "server ID 413*a*" shown in the server table 413 is an identification number which is assigned by the server information management processing unit 310 to a record newly added to the server table 413 so that the record can be uniquely identified in the table. The "availability 413*b*" indicates whether each logical server held in each record is available or not and available time periods if available.

Figure 4:
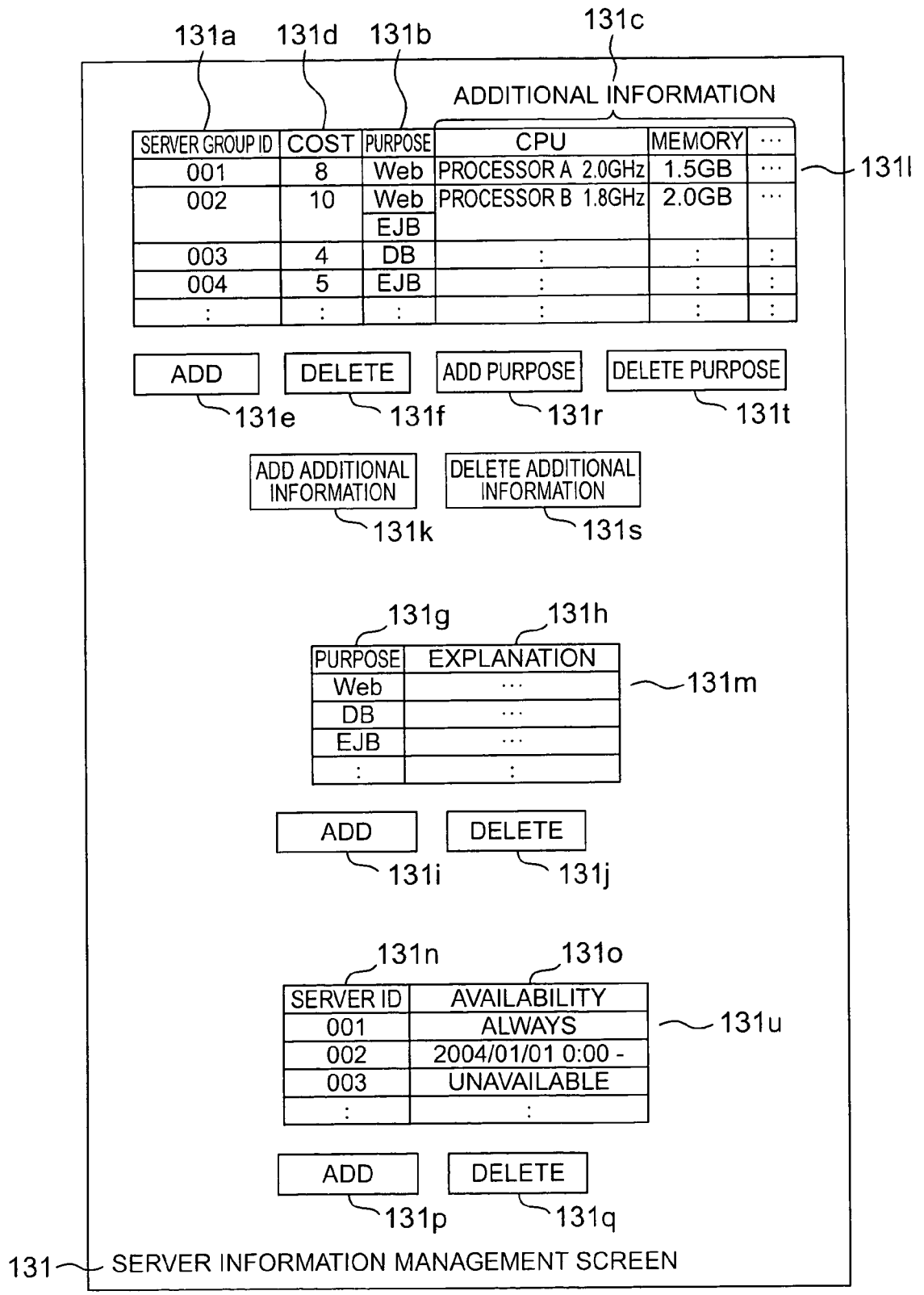
FIG. 4 is a schematic diagram showing the details of a server information management screen of the embodiment.

FIG. 4 is a schematic diagram showing the details of the server information management screen 131 of this embodiment. In this embodiment, the system manager adds, edits and deletes information on the logical servers and logical server groups using the server information management screen 131 shown in FIG. 4. Addition, editing and deletion of the purposes can also be carried out through the server information management screen 131.

In the server information management screen 131, tables 131*l*, 131*m* and 131*u* correspond to the server group table 411, the server purpose definition table 412 and the server table 413 of the server information management table 410, respectively.

The update of the server information management table 410 may either be done on every operation on the server information management screen 131 by the system manager or only when an "apply" button is pressed or clicked. The synchronization between the server information management screen 131 and the server information management table 410 is maintained by a known method.

The "purpose 131*b*" in the table 131*l* is displayed in the form of a pull-down menu according to the contents of the server purpose definition table 412. The system manager determines the purpose 131*b* by making a selection from the pull-down menu. The "purpose 131*b*" may employ other display/selection methods than the pull-down menu as long as the method lets the system manager make a selection (without allowing editing by means of direct entry). The "additional information 131*c*" can be edited by direct entry, whereas the "server group ID 131*a*" can not be edited.

While the additional information 131*c* can be blank, the purpose 131*b* must be filled with one or more selected purposes. In cases where two or more purposes 131*b* are designated for a server group ID 131*a*, the two or more purposes 131*b* must be different from one another.

When an "add" button 131e is pressed or clicked, the system management client 100 adds a new line to the table 131l, assigns a server group ID 131a to the line (for a new server group), and creates a new table 131u for the new server group.

If a "delete" button 131f is pressed or clicked when one of the server group IDs 131a has been selected, the system management client 100 deletes all the lines of the table 131l designated by the selected server group ID 131a and deletes the table 131u for the server group. Incidentally, the "delete" button 131f becomes invalid when the table 131u (corresponding to the currently selected server group ID 131a) includes one or more lines at that point.

When an "add additional information" button 131k is pressed or clicked, the system management client 100 adds a column to the additional information 131c and receives an input regarding the name of the new column of additional information (CPU, memory, etc.). In this case, inputting a name that already exists in the additional information 131c causes an error message.

If a "delete additional information" button 131s is pressed or clicked when a name (column) of the additional information 131c has been selected, the system management client 100 deletes the column of the additional information 131c of the table 131l.

If an "add purpose" button 131r is pressed or clicked when one of the server group IDs 131a has been selected, the system management client 100 adds a new line (for a newly added purpose) to the table 131l and assigns the new line the server group IDs 131a which has been selected.

If a "delete purpose" button 131t is pressed or clicked when a combination of a server group ID 131a and a purpose 131b has been selected, the system management client 100 deletes a line of the table 131l designated by the server group ID 131a and the purpose 131b. Incidentally, the "delete purpose" button 131t becomes invalid when the selected server group ID 131a has only one purpose 131b assigned thereto at that point.

Meanwhile, in the table 131m, "purpose 131g" and "explanation 131h" can be edited by means of direct entry. While the explanation 131h may be blank, the purpose 131g must be filled. In cases where a purpose 131g has already been designated in at least one cell of the purpose 131b of the table 131l, editing of that particular purpose 131g in the table 131m is prohibited. Designating an already-used name of purpose as the purpose 131g is not allowed.

When an "add" button 131i is pressed or clicked, the system management client 100 adds a new line to the table 131m. If a "delete" button 131j is pressed or clicked when one of the purposes 131g has been selected, the system management client 100 deletes the line of the selected purposes 131g from the table 131m. Incidentally, the "delete" button 131j becomes invalid when the selected purposes 131g has already been designated in at least one cell of the purpose 131b of the table 131l.

In the table 131u, "availability 131o" can be edited by direct entry, whereas "server ID 131n" can not be edited. No blank cell is allowed in the availability 131o. When a cell of the availability 131o is altered, the reservation management processing unit 330 carries out a re-reservation process.

When an "add" button 131p is pressed or clicked, the system management client 100 adds a new line to the table 131u and assigns a server ID 131n to the new line (for a new server). If a "delete" button 131q is pressed or clicked when one of the server IDs 131n has been selected, the system management client 100 deletes the line of the selected logical server (having the selected server ID 131n) from the table 131u. When a server ID 131n is deleted, the reservation management processing unit 330 carries out the re-reservation process.

As explained above, in the server information management function of this embodiment, information on each logical server is held in the server table 413, while logical servers of the same type are regarded as a logical server group and information on each logical server group is held in the server group table 411, in which the purposes 411b are introduced as indices of the logical server groups.

The server table 413 holds information on whether each logical server is available or not and available time periods if available. Since the re-reservation process is automatically conducted when alteration or deletion is made to the server table 413, the system manager is allowed to manage the logical servers without being aware of actual reservation statuses of the business services.

Figure 5:
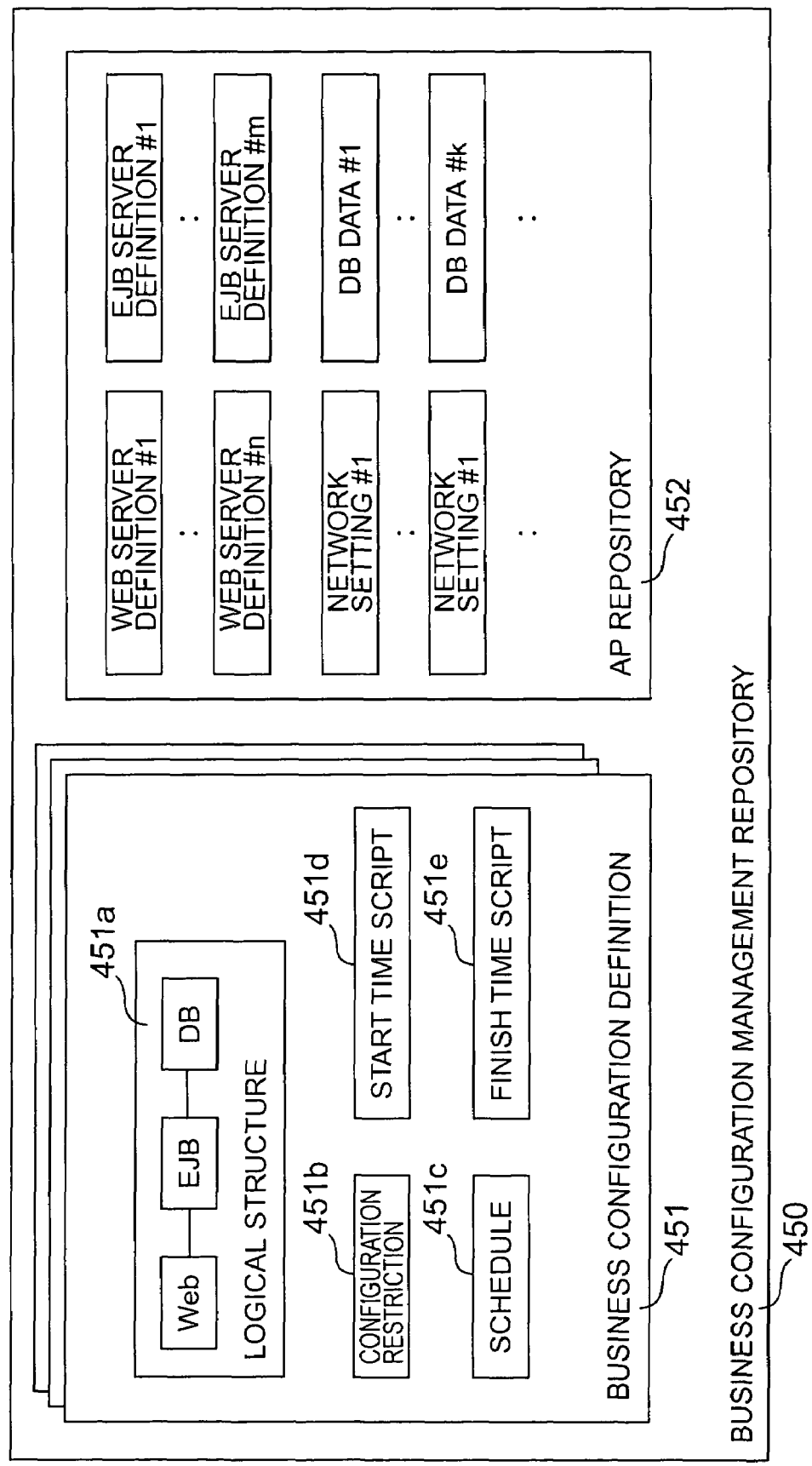
FIG. 5 is a schematic diagram showing the details of a business configuration management repository of the embodiment.

FIG. 5 is a schematic diagram showing the details of the business configuration management repository 450 of this embodiment. As shown in FIG. 5, the business configuration management repository 450 is composed of a plurality of business configuration definitions 451 (each of which is defined for each business service) and an AP repository 452. The AP repository 452 stores programs, definition information, data, etc. that are necessary for the business services. The repository may also be formed as a database.

Each business configuration definition 451 includes "logical structure 451a", "configuration restriction 451b", "schedule 451c", "start time script 451d", and "finish time script 451e".

The logical structure 451a indicates a logical system configuration of the business service that is defined in the business configuration definition 451. The "logical system configuration" includes information that can designate the required type of each logical server (concretely, the purpose (one of the purposes 412a defined in the server purpose definition table 412) of each element of the logical system configuration) and information on wire connection relationship among the elements.

The configuration restriction 451b indicates scalability of each node of the logical structure 451a and restriction on the wire connection relationship. The "scalability" means information indicating whether or not the node can be implemented by two or more logical servers. The "restriction on wire connection relationship" means information indicating whether or not parent nodes and child nodes in the wire connection have to have fixed relationship.

FIG. 6 is a table showing the details of the configuration restriction 451b employed in this embodiment. In this embodiment, the configuration restriction 451b holds the detailed information shown in FIG. 6 regarding all the nodes and wire connection relationship included in the logical structure 451a.

FIG. 7 is a schematic diagram showing concrete examples of the logical structure 451a and the configuration restriction 451b employed in this embodiment. In this embodiment, the logical structure 451a and the configuration restriction 451b are typically expressed by use of the XML format, as in the concrete example of FIG. 7.

The schedule 451c indicates the operating schedule of the business service. While the schedule 451c typically includes start time and finish time, other types of schedule (permanent business service with no finish time, iterative processing (daily, weekly, etc.), etc.) can also be realized with ease by extending the method described in this embodiment.

FIG. 8 is a schematic diagram showing the details of the start time script 451d and the finish time script 451e employed in this embodiment. The start time script 451*d* in this embodiment indicates steps that have to be executed when the business service is started. Specifically, the start time script 451*d* of FIG. 8 includes "step 451*d*1", "process target 451*d*2", "process contents 451*d*3", "omission judgment flag 451*d*4", and "corresponding finish time step 451*d*5". The step 451*d*1 is assigned by the business configuration management processing unit 350 so that each step can be uniquely identified in the start time script 451*d*. The process contents 451*d*3 (contents of the process executed in the step) is described and recorded in a format that can be recognized by the system construction module 500 or that can be converted by the system construction processing unit 360 to be recognized by the system construction module 500. The omission judgment flag 451*d*4 is set in order to let the reservation management processing unit 330 recognize the process contents 451*d*3 of the step. The omission judgment flag 451*d*4 is employed on the assumption that the reservation management processing unit 330 can not directly recognize the process contents 451*d*3.

The process target 451*d*2 indicates the target of the process which is executed in the step. Similarly to the logical structure 451*a*, the process target 451*d*2 includes information that can designate the required logical server type of the target, that is, information designating one of the purposes 412*a* defined in the server purpose definition table 412. Incidentally, the process target 451*d*2 may also designate something else as long as it is described in a format that can be recognized by the system construction module 500 or that can be converted by the system construction processing unit 360 to be recognized by the system construction module 500.

In the corresponding finish time step 451*d*5, a step 451*e*1 (e.g. T004) of the finish time script 451*e* that corresponds to the step (e.g. S001) is set.

The finish time script 451*e* indicates steps that have to be executed when the business service defined by the business configuration definition 451 is finished. Specifically, the finish time script 451*e* of FIG. 8 includes "step 451*e*1", "process target 451*e*2", "process contents 451*e*3", "omission judgment flag 451*e*4", and "corresponding start time step 451*e*5". The step 451*e*1 is assigned by the business configuration management processing unit 350 so that each step can be uniquely identified in the finish time script 451*e*. The process contents 451*e*3 (contents of the process executed in the step) is described and recorded in a format that can be recognized by the system construction module 500 or that can be converted by the system construction processing unit 360 to be recognized by the system construction module 500. The omission judgment flag 451*e*4 is set in order to let the reservation management processing unit 330 recognize the process contents 451*e*3 of the step. The omission judgment flag 451*e*4 is employed on the assumption that the reservation management processing unit 330 can not directly recognize the process contents 451*e*3.

The process target 451*e*2 indicates the target of the process which is executed in the step. Similarly to the logical structure 451*a*, the process target 451*e*2 includes information that can designate the required logical server type of the target, that is, information designating one of the purposes 412*a* defined in the server purpose definition table 412. Incidentally, the process target 451*e*2 may also designate something else as long as it is described in a format that can be recognized by the system construction module 500 or that can be converted by the system construction processing unit 360 to be recognized by the system construction module 500.

In the "corresponding start time step 451*e*5", a step 451*d*1 (e.g. S004) of the start time script 451*d* that corresponds to the step (e.g. T001) is set.

Meanwhile, the AP repository 452 of the business configuration management repository 450 stores programs, definition information, data, etc. to be referred to by the start time script 451*d* and the finish time script 451*e*.

In this embodiment, the business manager carries out addition, editing and deletion of information on the business configuration definition 451 and registration (of programs, information, data, etc.) with the AP repository 452 by use of the business configuration management screen 231. Processes carried out with the business configuration management screen 231 is basically the same as the processes in the above explanation of the server information management screen 131, except for the processes described below. When the business configuration management processing unit 350 deletes a business configuration definition 451 regarding a business service, the reservation management processing unit 330 carries out a reservation deletion (cancellation) process for the business service. When the business configuration management processing unit 350 alters a business configuration definition 451 regarding a business service, the reservation management processing unit 330 carries out a re-reservation process for the business service.

Figure 9:
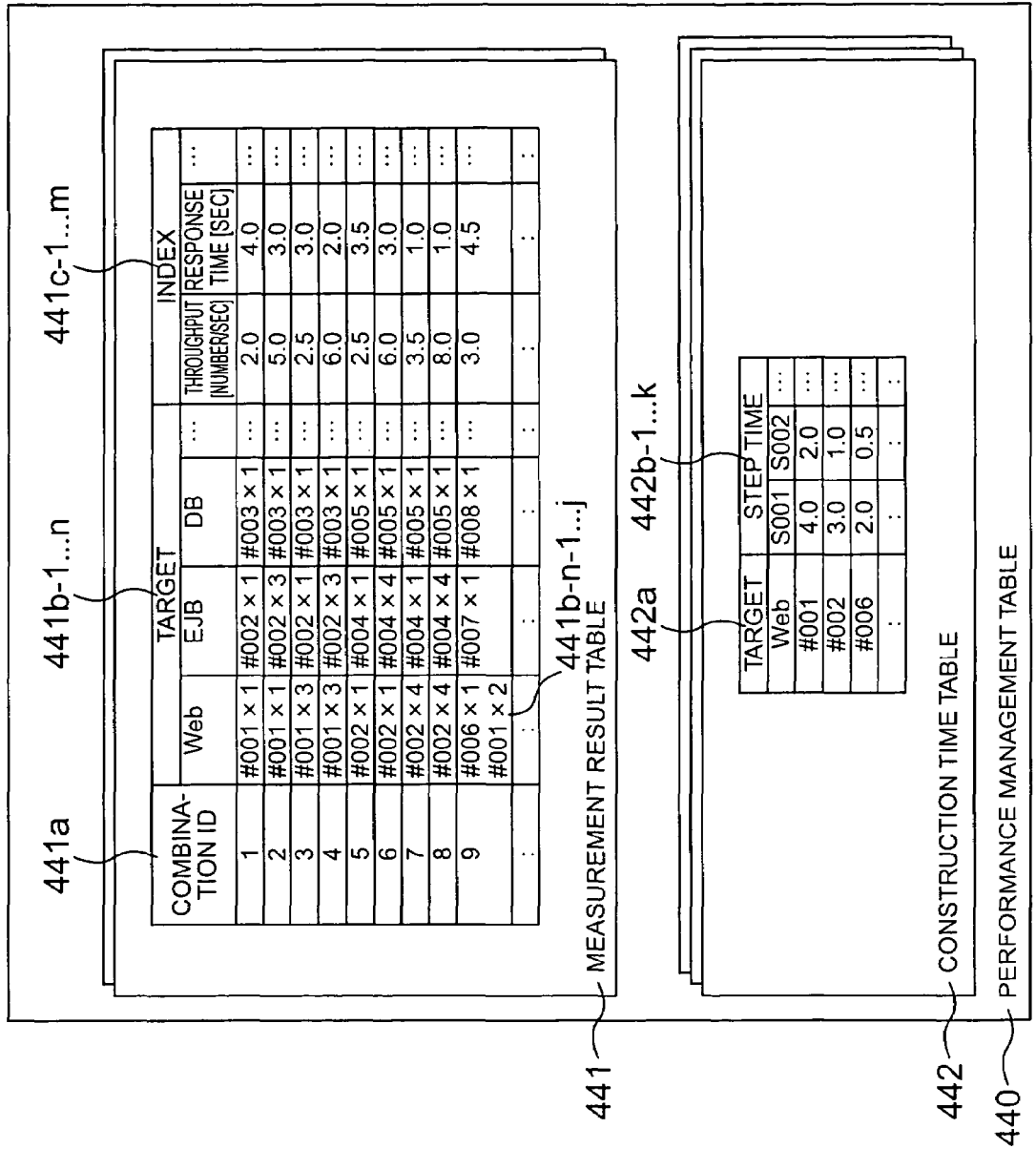
FIG. 9 is a schematic diagram showing the details of a performance management table of the embodiment.

FIG. 9 is a schematic diagram showing the details of the performance management table 440 of this embodiment. The performance management table 440 of FIG. 9 is composed of a plurality of measurement result tables (performance management main tables) 441 and a plurality of construction time tables 442. A measurement result table 441 necessarily exists corresponding to a business configuration definition 451. A construction time table 442 corresponds to a node of a "logical structure 451*a*".

The measurement result table 441 indicates the results of performance measurement when logical servers were actually assigned to the logical structure 451*a* by the system construction module 500. The performance measurement results obtained by known techniques are inputted to the measurement result table 441 by the system manager through the performance management screen 134.

The "combination ID 441*a*" of the measurement result table 441 is assigned by the performance management processing unit 340 when a record is added to the measurement result table 441 so that the record can be uniquely identified in the table.

Each "target (441*b*-1-441*b-n*)" (n: positive integer) corresponds to each node of the logical structure 451*a*. In each target 441*b* (441*b*-1-441*b-n*), one or more server group IDs 411*a* (in the server group table 4-11) having a purpose 411*b* identical with the purpose of the node (of the logical structure 451*a* corresponding to the target 441*b*) are set, together with the number of logical servers that are employed from each logical server group corresponding to the server group ID. Incidentally, the targets 441*b*-1-441*b-n* are not required to include all the nodes of the logical structure 451*a* ("n" can be smaller than the total number of the nodes of the logical structure 451*a*). The settings may be done for part of the nodes when there are too many nodes in the logical structure 451*a*.

Each "index (441*c*-1-441*c-m*)" (m: positive integer) corresponds to one of the indices for fulfilling the contracts or agreements made with the user regarding the service quality. In each index 441*c* (441*c*-1-441*c-m*), a measured value obtained from the combination is set. Any quantifiable index to be fulfilled by the business service can be employed as the index 441*c*. Thus, in addition to the throughput and response time shown in FIG. 9, measurement results by various bench mark tools, processing time necessary for specific calculations such as Fourier transform or topological analysis, simultaneous access number, download time, average latency time, etc. can be employed as the index 441c.

Each construction time table 442 corresponds to each node of a "logical structure 451a". Similarly to the targets 441b-1-441b-n, the construction time tables 442 are not required to cover all the nodes of the logical structure 451a (especially when there are lots of nodes); however, there has to be a one-to-one correspondence between the construction time tables 442 and the targets 441b-1-441b-n.

The "target 442a" in a construction time table 442 is identical with a target 441b (in the measurement result table 441) that corresponds to the construction time table 442. In the target 442a, server group IDs 411a in the server group table 411 are set.

The "step time 442b-1-442b-k" includes all the steps (in the start time script 451d or the finish time script 451e) whose process target 451d2 or 451e2 designates the node (of the logical structure 451a) corresponding to the construction time table 442. In each step time 442b, processing time actually used for executing the step to the target 442a is set.

In this embodiment, the business manager carries out addition, editing and deletion of information on the measurement result table 441 and the construction time table 442 by use of the performance management screen 134. Processes carried out with the performance management screen 134 is similar to the aforementioned processes in the explanation of the server information management screen 131.

The performance management table 440 is updated at proper intervals by the performance management processing unit 340 and the system construction module 500 based on results of actual operations.

The system manager, having a wide knowledge on information processors under his/her management, might add a record to the performance management table 440 based on inference from typical patterns he/she learned. However, since such records added by inference are also updated properly based on the results of actual operations, the reliability of the performance management table 440 increases naturally as the actual operations are repeated. Since the system manager has much knowledge on server performance and past experiences, with some experiences of operations with similar configurations, the inference becomes possible and reliable to some extent based on performance of the information processors and performance measurement results.

Figure 10:
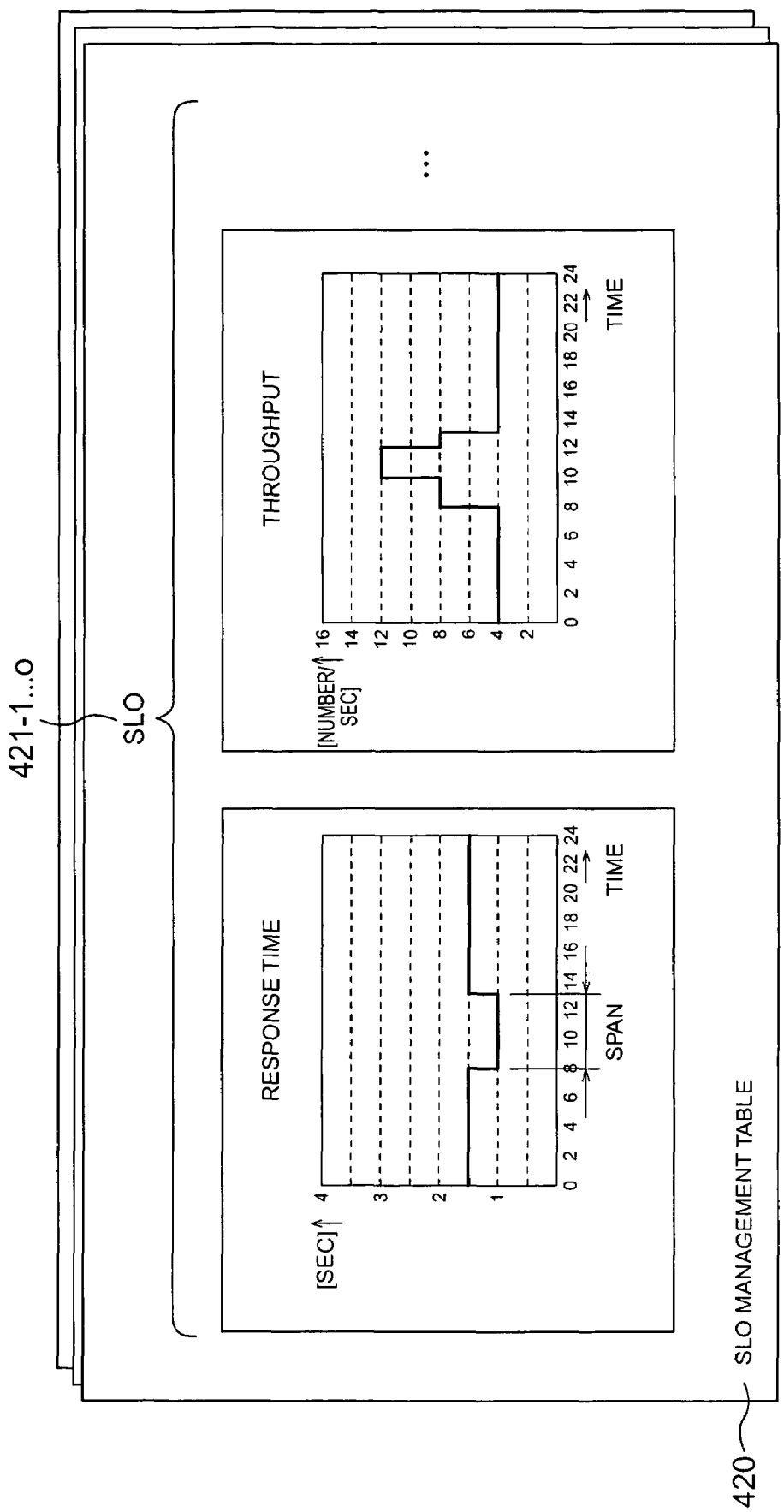
FIG. 10 is a schematic diagram showing the details of an SLO (Service Level Objective) management table of the embodiment.

FIG. 10 is a schematic diagram showing the details of the SLO management table 420 of this embodiment. As shown in FIG. 10, each SLO management table 420 includes a plurality of SLOs 421-1-421-o (o: positive integer). Each SLO management table (main table) 420 corresponds to each business configuration definition 451 in a one-to-one correspondence. The SLOs 421-1-421-o correspond to the indices 441c-1-441c-m of the measurement result table 441 basically in a one-to-one correspondence; however, missing elements are allowed on either side ("m" may differ from "o"). For example,. when there is a missing element in the indices 441c-1-441c-m, an SLO 421 corresponding to the missing element is ignored, and vice versa.

Typically, each SLO 421 is stored as a table in a relational database, and each span in the SLO is defined as a line (row) of the table. The "span" means a time period in the SLO during which the value of the index (held by the SLO) remains constant. There is no interval between two adjacent spans, that is, there is no oblique part (that is not horizontal nor vertical) in the graph having the horizontal time axis and the vertical index axis.

Each SLO is set by the system manager as a target value to fulfill the previously settled contract or agreement regarding the service quality. Each SLO 421-1-421-o is typically determined and set for a particular time period based on the variations in the process requests. However, similarly to the schedule 451c, iterative processing (daily, weekly, etc.) can also be realized easily by extending the method described in this embodiment.

Figure 11:
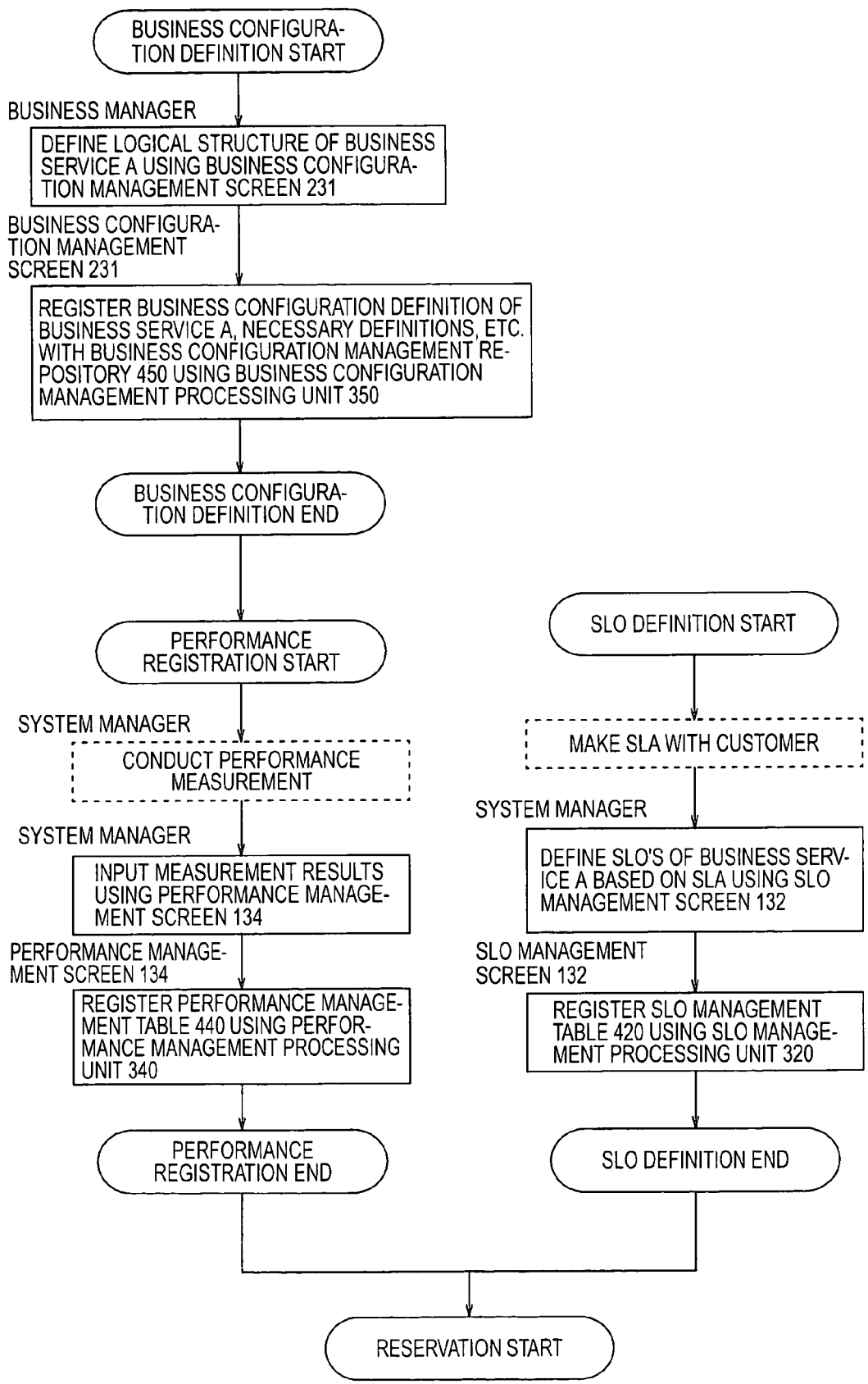
FIG. 11 is a flow chart showing the process flow of a business configuration management process, a performance management process and an SLO management process of the embodiment.

FIG. 11 is a flow chart showing the process flow of a business configuration management process, a performance management process and an SLO management process of this embodiment. As shown in FIG. 11, the business configuration management processing unit 350 of this embodiment receives an input of the business configuration definition 451 (including the logical structure 451a indicating logical system configuration of each business service, the schedule 451c indicating the operating schedule (start time, finish time, etc.) of the business service, the start time script and finish time script of the business service, etc.), and registers the inputted business configuration definition 451 with the business configuration management repository 450.

The performance management processing unit 340 receives performance measurement results (response time, throughput, etc.) when an actual logical server group was assigned to each business service, and registers the results with the performance management table 440 as information indicating the performance of each logical server.

The SLO management processing unit 320 receives SLOs of each business service in each time period (response time, throughput, etc.) as target values or objectives for fulfilling contracts or agreements with the user of the business service, and registers the SLOs with the SLO management table 420.

Figure 12:
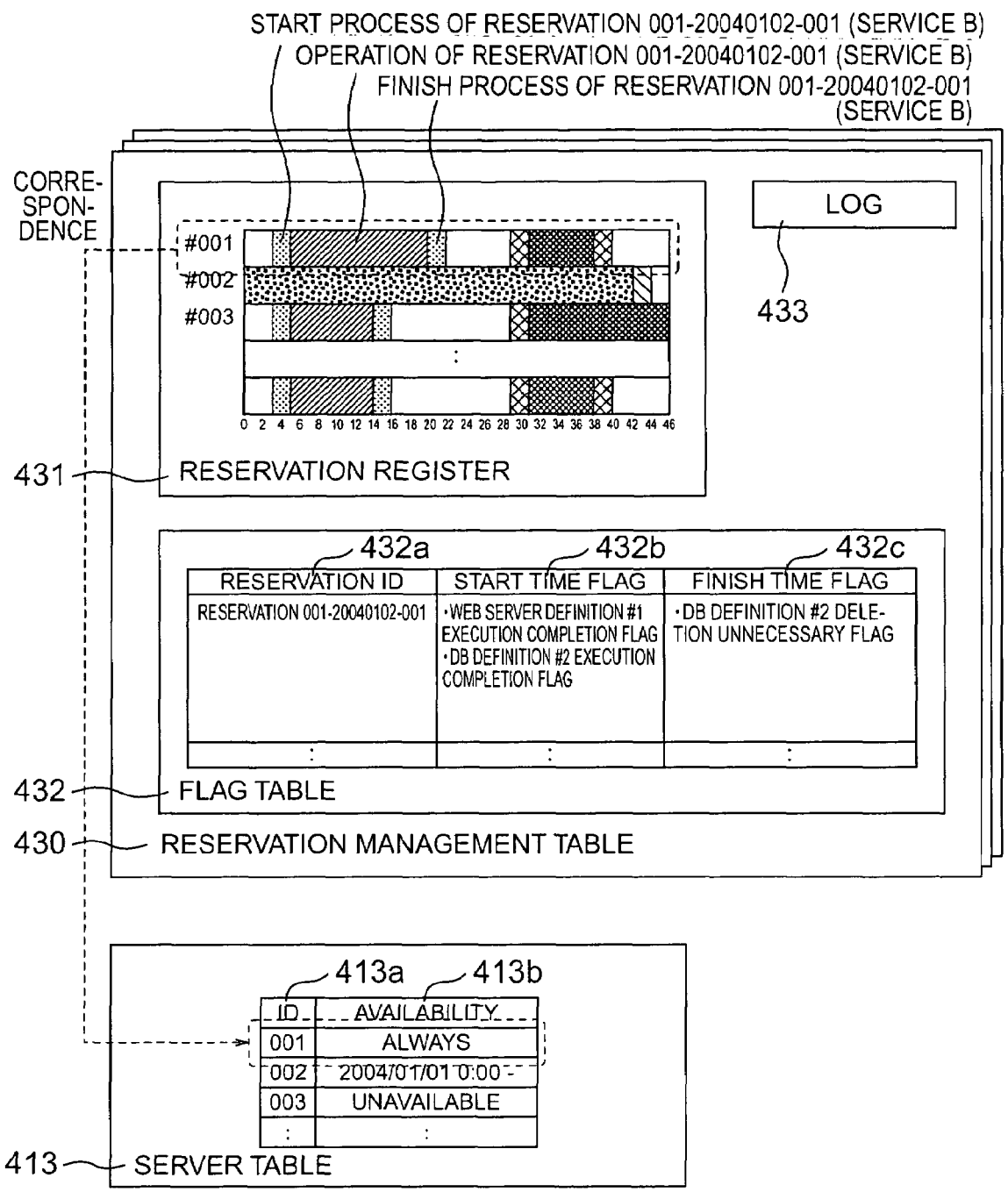
FIG. 12 is a schematic diagram showing the details of a reservation management table of the embodiment.

FIG. 12 is a schematic diagram showing the details of a reservation management table 430 employed in this embodiment. As shown in FIG. 12, the reservation management table 430 includes a reservation register 431, a flag table 432, and a log 433. Each record of the reservation register 431 corresponds to a record of the server table 413, and each reservation in the reservation register 431 corresponds to a record of the flag table 432.

In this embodiment, the "reservation" means occupying necessary logical servers in order to execute a particular business service (requested by the business manager) according to the schedule 451c. In this case, the business service is called "reserved business service (corresponding to the reservation)". Each reservation is assigned a unique reservation ID 432a.

The reservation register 431 of the reservation management table 430 holds a reservation schedule of each logical server. The "reservation schedule" means time information on the reservation, including start time and finish time of a start process, start time and finish time of an operation, and start time and finish time of a finish process. The finish time of the start process equals the start time of the operation, and the finish time of the operation equals the start time of the finish process.

The reservation register 431 also holds a tentative reservation schedule of each logical server. The "tentative reservation schedule" means time information on a tentative reservation, that is, a reservation schedule that is temporarily added to the reservation register 431 for the determination of a reservation. A reservation that has a tentative reservation schedule as its time information is especially called "tentative reservation". Each tentative reservation is assigned a unique tentative reservation ID.

The "start process of reservation" shown in FIG. 12 means a process executed by the start time script 451d of a reservation business service of the reservation, that is, the process contents 451d3 of a step of the start time script 451d whose process target 451d2 is the logical server (corresponding to the record of the reservation register 431). Similarly, the "finish process of reservation" shown in FIG. 12 means a process executed by the finish time script 451e of the reservation business service of the reservation, that is, the process contents 451e3 of a step of the finish time script 451e whose process target 451e2 is the logical server. The "operation of reservation" means the use of the logical server according to the schedule 451c by the reservation business service of the reservation.

In this embodiment, each logical server is not allowed to have overlapping reservation schedules; however, overlapping tentative reservation schedules are allowed.

The flag table 432 includes "reservation ID 432a", "start time flag 432b", and "finish time flag 432c". In the start time script 451d and the finish time script 451e, some steps can be omitted depending on preceding and following reservations. The start time flag 432b and the finish time flag 432c hold flags indicating the omittable steps (of the start time script 451d or the finish time script 451e) regarding the reservation identified by the reservation ID 432a.

Figure 13:
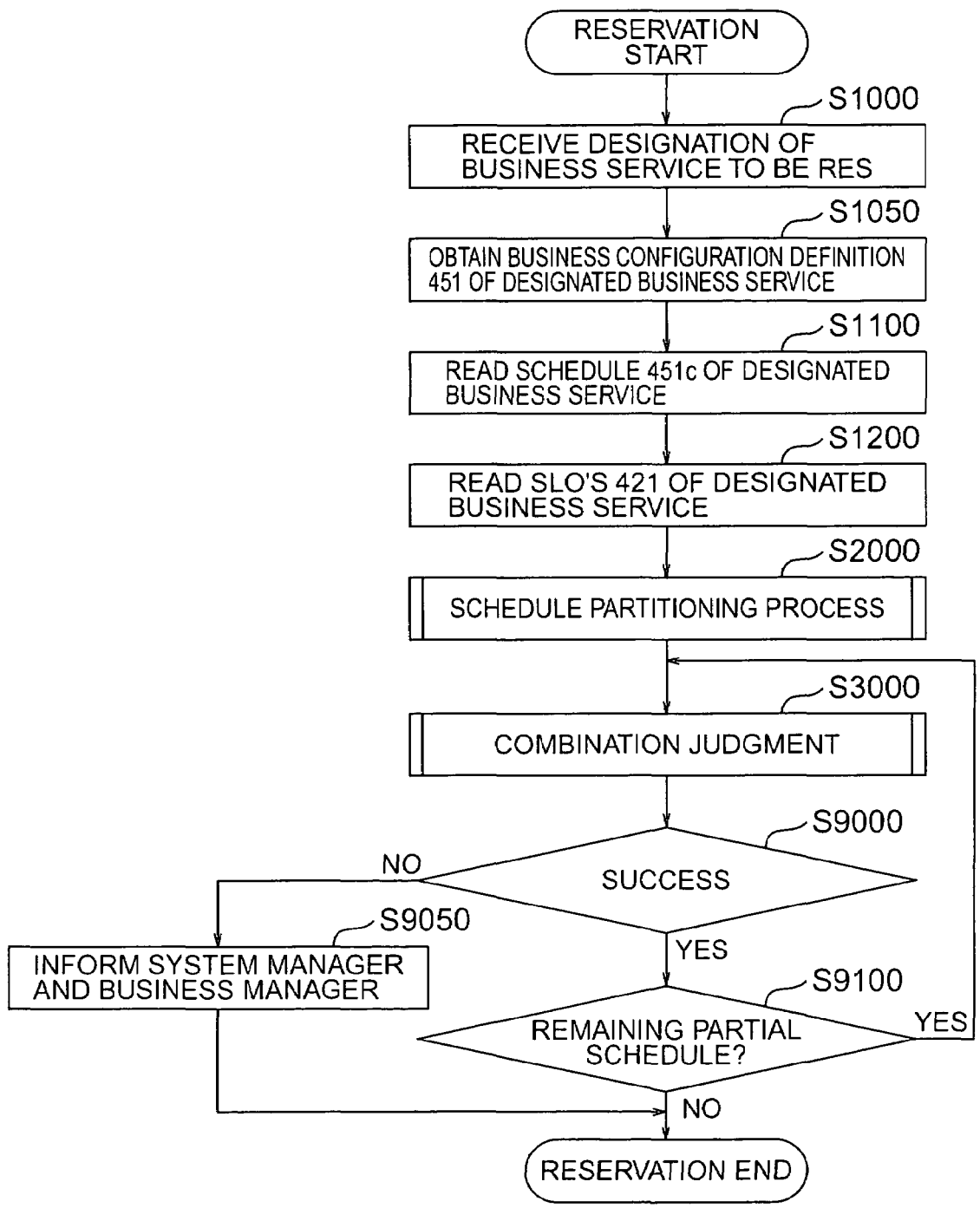
FIG. 13 is a flow chart showing the process flow of a reservation management main process of the embodiment.

FIG. 13 is a flow chart showing the process flow of a reservation management main process of this embodiment. The reservation management main process of FIG. 13 is started when the reservation management processing unit 330 received a request from the business management client 200. First, designation of a business service (as the target of the reservation process) is received (S1000).

The reservation management processing unit 330 requests the business configuration management processing unit 350 to fetch the business configuration definition 451 of the business service designated in the step S1000, obtains the business configuration definition 451 read out from the business configuration management repository 450 by the business configuration management processing unit 350 (S1050), and reads the schedule 451c from the obtained business configuration definition 451 (S1100).

The reservation management processing unit 330 also requests the SLO management processing unit 320 to fetch the SLOs 421 of the business service designated in the step S1000, and obtains the SLOs 421 read out from the SLO management table 420 by the SLO management processing unit 320 (S1200).

Subsequently, the reservation management processing unit 330 partitions the schedule 451c (which has been read in the step S1100) according to the obtained SLOs 421 (S2000), and assigns proper logical servers to each of the partial schedules (S3000).

Subsequently, the reservation management processing unit 330 checks whether or not the logical server assignment has succeeded (S9000). If the logical server assignment was successful (YES in S9000), the process returns to the step S3000 and the logical server assignment is carried out for each of remaining partial schedules (S9100). On the other hand, if the logical server assignment failed (NO in S9000), the reservation management processing unit 330 informs the system manager and the business manager of the failure (S9050).

Incidentally, while the step S3000 in the reservation process of this embodiment is assumed to be executed for one of the partial schedules at a time, simultaneous execution of the step S3000 for two or more partial schedules is also possible if proper exclusion processes are introduced as needed.

Figure 14:
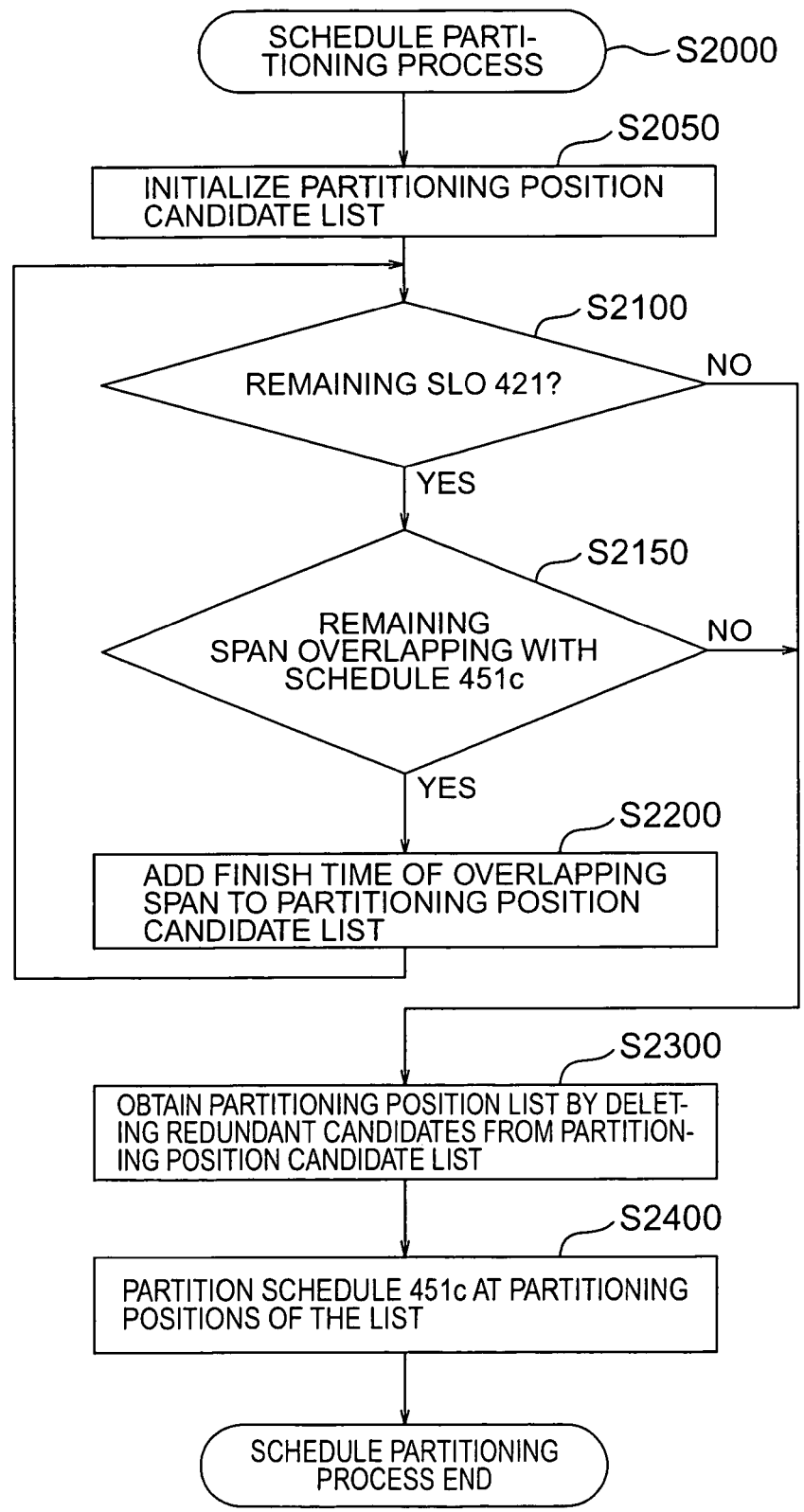
FIG. 14 is a flow chart showing the process flow of a schedule partitioning process (S2000) of the embodiment

FIG. 14 is a flow chart showing the process flow of the schedule partitioning process (S2000 of FIG. 13) of this embodiment. In the schedule partitioning process (S2000) of FIG. 14, the reservation management processing unit 330 first reserves an area for storing a partitioning position candidate list in memory and initializes the values of the list (S2050).

In the next step S2100, whether or not there remains an SLO 421 (obtained in the step S1200) that has not been used for the schedule partitioning process yet is judged. If there remains an unused SLO 421 (YES in S2100), the process proceeds to step S2150.

In the step S2150, whether or not there remains in the spans of the remaining SLO 421 (judged as "remaining" in the step S2100) a span that at least partially overlaps with (the span of) the schedule 451c (read in the step S1100 of FIG. 13) is judged. If there remains an overlapping span (YES in S2150), the finish time of the remaining span (judged as "remaining" in the step S2150) is added to the partitioning position candidate list (S2200).

If there exists no remaining SLO 421 in the step S2100, the process proceeds to step S2300, in which a partitioning position list is obtained by deleting redundant candidates (indicating the same time) from the partitioning position candidate list. Finally, the partitioning positions (indicating time) are successively extracted from the partitioning position list in order of time, and the schedule 451c is partitioned at the partitioning positions (S2400).

Figure 15:
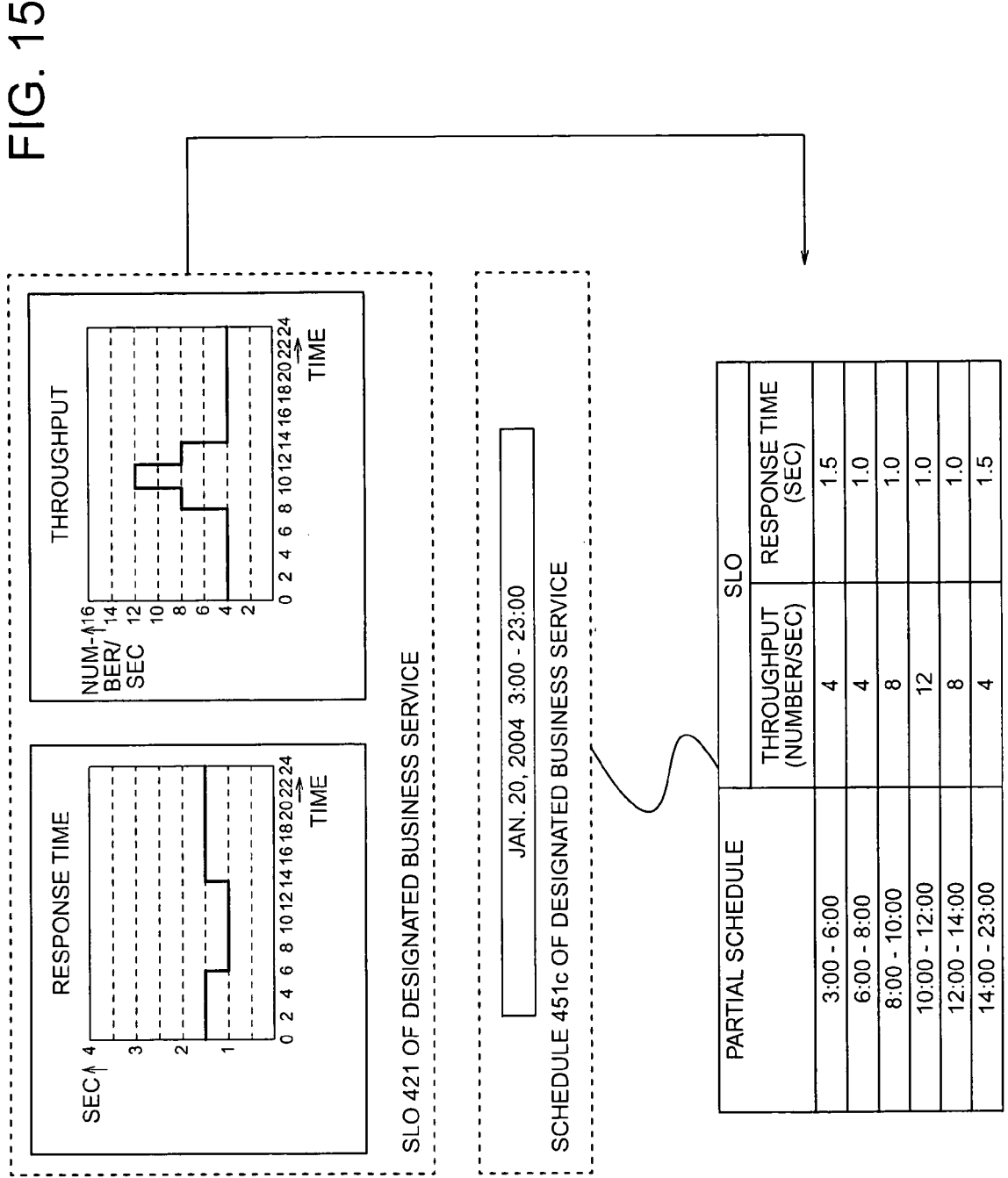
FIG. 15 is a schematic diagram showing a concrete example of the schedule partitioning process (S2000) of the embodiment.

FIG. 15 is a schematic diagram showing a concrete example of the schedule partitioning process (S2000) of this embodiment. In the example of FIG. 15, within the whole span of the schedule 451c (3:00-23:00), the SLO "response time" includes three overlapping spans: "3:00-6:00", "6:00-14:00" and "14:00-23:00", and the SLO "throughput" includes five overlapping spans: "3:00-8:00", "8:00-10:00", "10:00-12:00", "12:00-14:00" and "14:00-23:00". Thus, the schedule 451c is partitioned into "3:00-6:00", "6:00-8:00", "8:00-10:00", "10:00-12:00", "12:00-14:00" and "14:00-23:00".

Incidentally, since the above method assigns logical servers to each partial schedule independently, it seems that the partial schedules might be assigned different logical servers like:

3:00-6:00: logical server #001×3
   6:00-8:00: logical server #002×5
   8:00-10:00: logical server #003×4,
     logical server #004×1
   10:00-12:00: logical server #001×4
   12:00-14:00: logical server #005×1
   14:00-23:00: logical server #001×2 and much waste might be caused by the overhead for switching logical servers. However, such a problem does not come up in this embodiment since a step S5300 which will be explained later executes the logical server assignment avoiding the wasteful switching (consecutively using a logical server that is available across two or more partial schedules).

Figure 16:
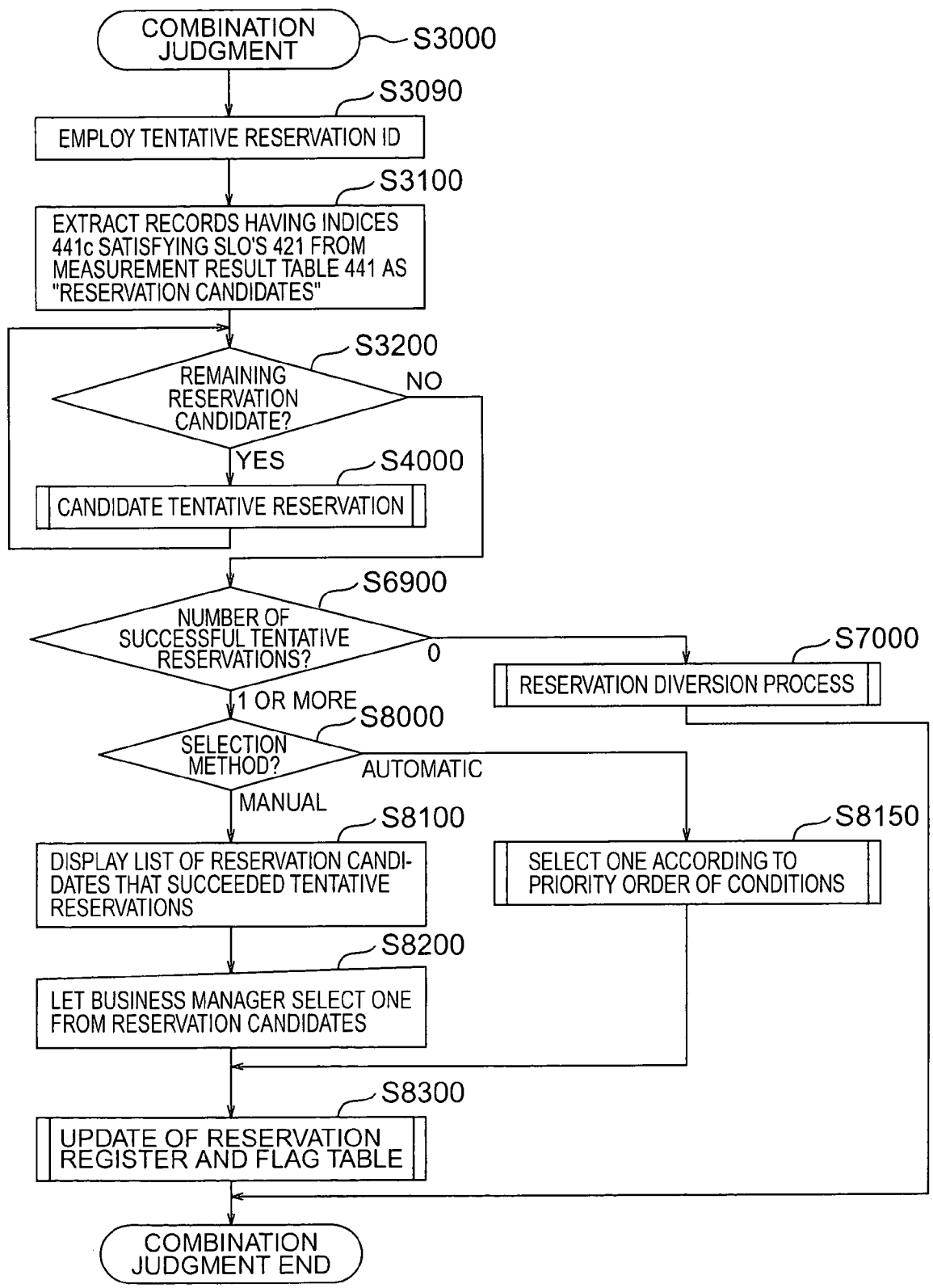
FIG. 16 is a flow chart showing the process flow of a combination judgment process (S3000) of the embodiment.

FIG. 16 is a flow chart showing the process flow of the combination judgment process (S3000) of this embodiment. As shown in FIG. 16, the combination judgment process (S3000) assigns logical servers to the logical structure 451a of the business service designated in the step S1000, for each of the partial schedules.

The reservation management processing unit 330 first employs a tentative reservation ID (S3090), and extracts suitable records (having indices 441c satisfying the SLOs 421 in the partial schedule) from the measurement result table 441 as "reservation candidates" (S3100).

Subsequently, the reservation management processing unit 330 executes a "candidate tentative reservation process" (S4000) for each of the extracted reservation candidates. In the candidate tentative reservation process, whether the reservation of the extracted reservation candidate is possible or not is checked by reference to the reservation register 431 and the server table 413, and if the reservation is possible, the aforementioned tentative reservation is made (S3200, S4000).

Subsequently, the reservation management processing unit 330 checks the number of successful tentative reservations made by the candidate tentative reservation process of the step S4000 (S6900). If there is one or more successful tentative reservations, the process proceeds to step S8000, otherwise the process proceeds to a "reservation diversion process" of step S7000.

In the step S8000, whether a preset selection method is "manual" or "automatic" is checked. If "automatic", one of the reservation candidates (with the successful tentative reservations) that is the most suitable for the assignment to the partial schedule is selected according to a preset priority order of conditions (S8150).

Meanwhile, if the preset selection method is "manual" in the step S8000, a list of the reservation candidates (with the successful tentative reservations) is displayed on the reservation management screen 133 (S8100), and a selection made by the business manager is received (S8200).

Finally, the reservation management processing unit 330 determines the reservation of the selected reservation candidate (automatically selected in the step S8150 or manually selected by the business manager in the step S8200), and thereby updates the reservation register 431 and the flag table 432 (S8300).

The details of the automatic/manual selection steps S8150 and S8200 will be described later.

Figure 17:
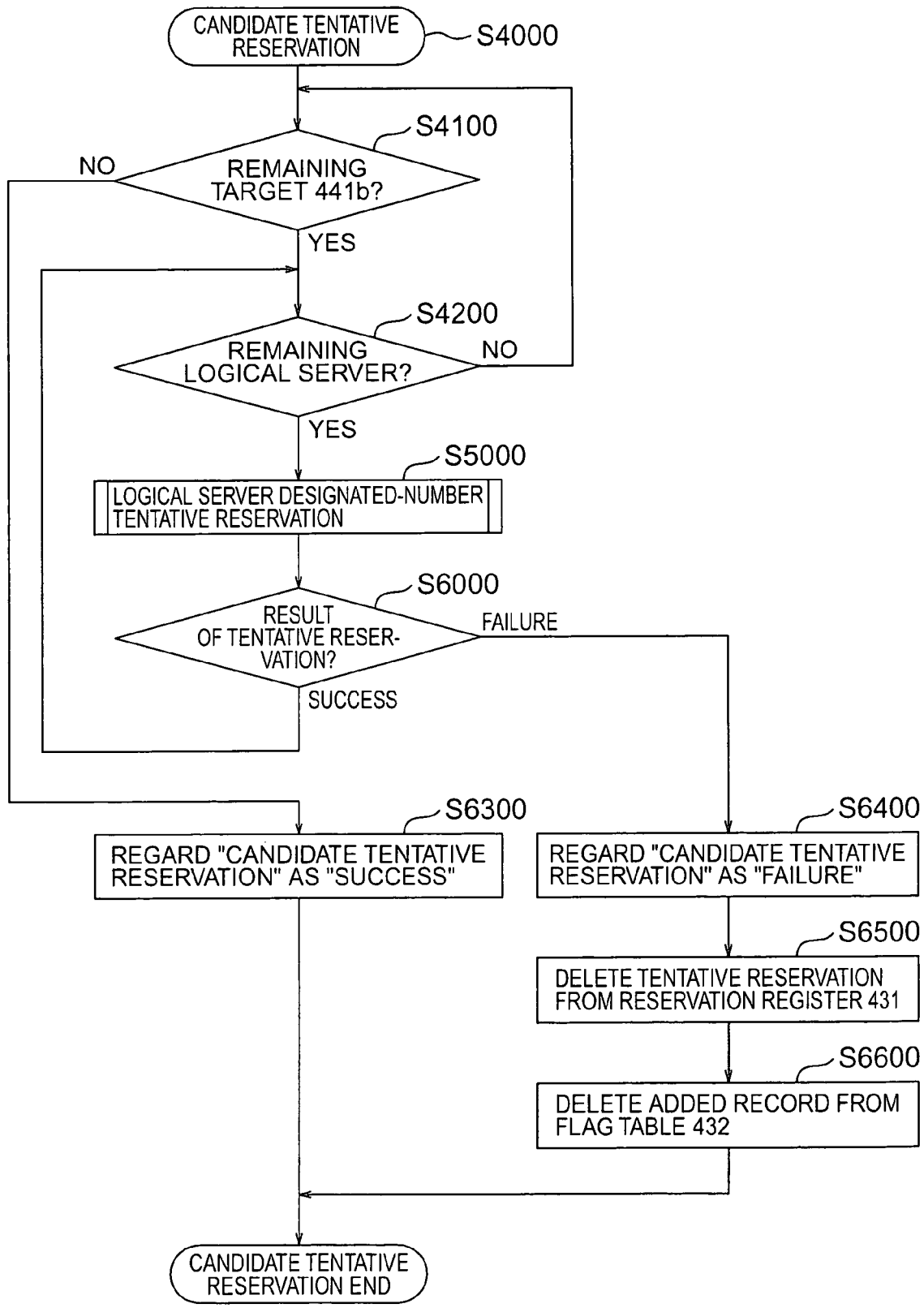
FIG. 17 is a flow chart showing the process flow of a candidate tentative reservation process (S4000) of the embodiment.

FIG. 17 is a flow chart showing the process flow of the candidate tentative reservation process (S4000) of this embodiment. As shown in FIG. 17, the candidate tentative reservation process (S4000) judges the reservation possibility of each reservation candidate. If the reservation is possible, the reservation register 431 and the flag table 432 are temporarily updated. Specifically, the reservation of the reservation candidate is possible if reservations of the targets 441b-1-441b-n are all possible. As for each target 441b-x (x: integer between 1 and n), the reservation of the target 441b-x is possible if reservations of designated number of logical servers 441b-x-1-441b-x-j are all possible.

In step S4100 of FIG. 17, the reservation management processing unit 330 checks whether or not there remains (in the extracted record of the reservation candidate) a target 441b whose reservation possibility has not been judged yet. If there is a remaining target 441b (YES in S4100), the process proceeds to step S4200.

In the step S4200, whether or not there remains (in the logical servers of the remaining target 441b) a logical server whose reservation possibility has not been judged yet. If there is a remaining logical server (YES in S4200), the process proceeds to step S5000, in which whether the reservation of the designated number of logical servers (designated in the "target 441b") is possible or not is judged.

In the next step S6000, whether the tentative reservation of the designated number of logical servers has succeeded or not is judged by referring to a returned value from the step S5000 (indicating the result of the tentative reservation in the step S5000). If the tentative reservation has succeeded, the process returns to the step S4200. If there is at least one logical server (among the designated number of logical servers) whose tentative reservation is impossible, the tentative reservation of the reservation candidate is regarded as failure (S6400). In this case, the contents of the reservation register 431 regarding the tentative reservation (which have been added in the step S5000) are all deleted (S6500), and a record of the flag table 432 regarding the tentative reservation (which has been added in the step S5000) is deleted (S6600).

Meanwhile, if there remains no target 441b in the step S4100 (that is, if the tentative reservation has succeeded for all the designated number of logical servers of all the targets 441b), the tentative reservation of the reservation candidate is regarded as success (S6300).

Figure 18:
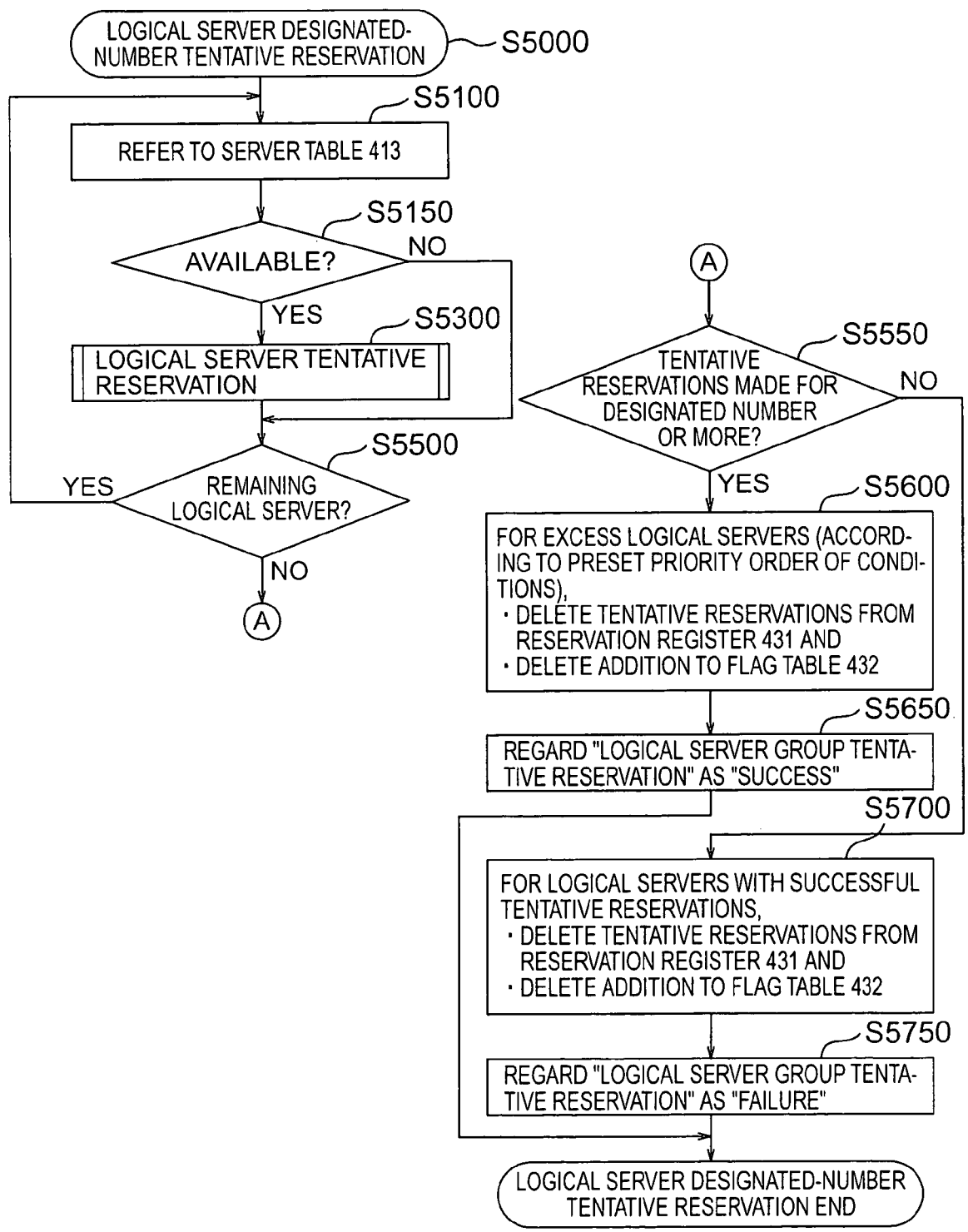
FIG. 18 is a flow chart showing the process flow of a logical server designated-number tentative reservation process (S5000) of the embodiment.

FIG. 18 is a flow chart showing the process flow of the logical server designated-number tentative reservation process (S5000) of this embodiment. As shown in FIG. 18, the logical server designated-number tentative reservation process (S5000) makes the judgment on the possibility of the designated number of reservations, for each logical server group. If the reservations are possible, the reservation register 431 and the flag table 432 are temporarily updated. For the judgment, all the records of the server table 413 and reservation register 431 of the logical server group are examined and thereby any logical server that can be reserved is selected first. Thereafter, from the selected logical servers, the designated number of logical servers that are most suitable for the assignment are selected and tentatively reserved according to a preset priority order of conditions.

First, the reservation management processing unit 330 refers to the availability 413b of the server table 413 (S5100) and thereby judges whether or not each logical server is available or not (S5150). In the step S5150, the availability of the logical server in the server table 413 during a time period {[a]+[the partial schedule]+[b]} (hereinafter, referred to as "reservation request time") is judged, where [a] means total time necessary for a step of the start time script 451d whose process target 451d2 is identical with the purpose of the logical server and [b] means total time necessary for a step of the finish time script 451e whose process target 451e2 is identical with the purpose of the logical server. Incidentally, the purpose of the logical server can be judged from the measurement result table 441 (in which target 441b the logical server is included). Time information for calculating the total time can be obtained from a construction time table 442 corresponding to the purpose of the logical server.

If the logical server is judged to be available in the step S5150, the reservation management processing unit 330 judges whether the logical server can be reserved or not by referring to a record of the reservation register 431 regarding the logical server. If the reservation is possible, the logical server is tentatively reserved (S5300). In this case, if there is an overlap with a reservation schedule of a preceding or following reservation and one or more steps of the start time script 451d or the finish time script 451e can be omitted, the tentative reservation is made omitting such steps.

The reservation management processing unit 330 executes the steps S5100-S5300 for all the logical servers included in the server table 413 (S5500).

In the step S5500, whether or not there remains (among the logical servers in the server table 413) a logical server whose availability has not been judged yet is checked. If there is a remaining logical server (YES in S5500), the process is continued by returning to the step S5100, otherwise the process proceeds to step S5550.

In the step S5550, whether or not the number of tentative reservations made in the step S5300 is the designated number or more is judged. If the number of successful tentative reservations is the designated number or more (YES in S5550), the process proceeds to step S5600, otherwise the process proceeds to step S5700.

In the step S5600, according to the preset priority order of conditions, for the excess logical servers (other than the designated number of logical servers), the tentative reservation schedules are deleted from the reservation register 431 and the addition made to the flag table 432 is deleted. In the next step S5650, a return value indicating the success of the tentative reservation of the logical server group is set, and the logical server designated-number tentative reservation process is ended (the process is returned to the step S6000 of FIG. 17).

In the step S5700, for the logical servers (corresponding to the tentative reservations made in the step S5300), the tentative reservation schedules are deleted from the reservation register 431, and the addition made to the flag table 432 is deleted. In the next step S5750, a return value indicating the failure of the tentative reservation of the logical server group is set, and the logical server designated-number tentative reservation process is ended (the process is returned to the step S6000 of FIG. 17).

Figure 19:
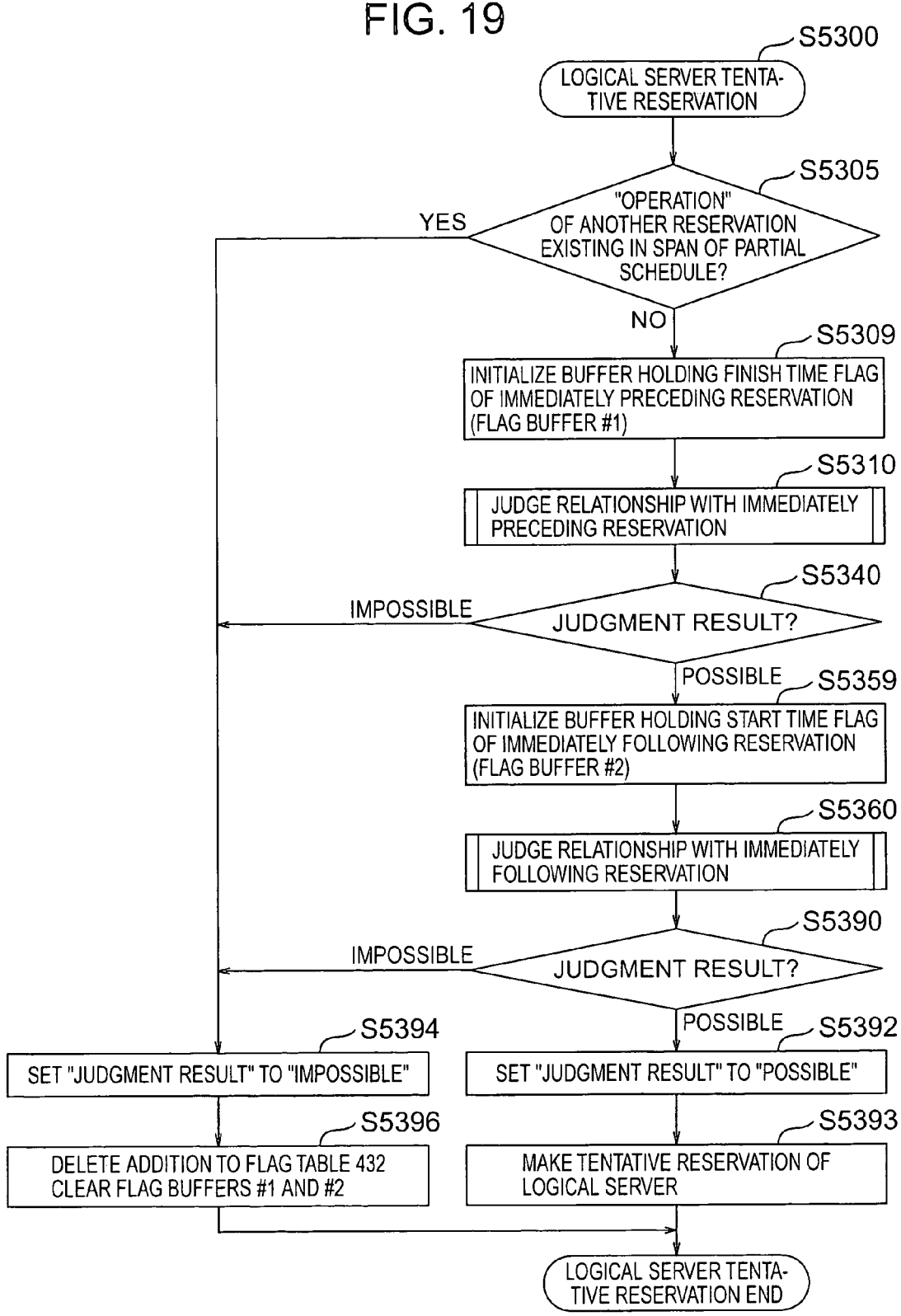
FIG. 19 is a flow chart showing the process flow of a logical server tentative reservation process (S5300) of the embodiment.

FIG. 19 is a flow chart showing the process flow of the logical server tentative reservation process (S5300) of this embodiment. As shown in FIG. 19, the logical server tentative reservation process (S5300) judges whether or not the logical server has been occupied by no other reservations during the reservation request time. The tentative reservation of the logical server is made if the reservation is possible.

The reservation management processing unit 330 first judges whether or not there exists the "operation" of another reservation in the span of the partial schedule (S5305). In the judgment, the "start process" or "finish process" of other reservations or other tentative reservation schedules may exist in the span of the partial schedule. If there is no "operation" of another reservation (NO in S5305), a buffer holding the finish time flag of the immediately preceding reservation (flag buffer #1) is initialized (S5309) and a process for judging the relationship with the immediately preceding reservation is conducted (S5310).

In the next step S5340, the judgment result of the step S5310 is referred to and if the result indicates that the reservation is possible, a buffer holding the start time flag of the immediately following reservation (flag buffer #2) is initialized (S5359) and a process for judging the relationship with the immediately following reservation is conducted (S5360).

In the next step S5390, the judgment result of the step S5360 is referred to and if the result indicates that the reservation is possible, the judgment result of the logical server tentative reservation is set to "possible" (S5392). In this case, the reservation management processing unit 330 determines to tentatively reserve the logical server using the tentative reservation ID employed in the step S3090, and adds a tentative reservation schedule identified by the tentative reservation ID to the reservation register 431 (S5393).

Incidentally, the "immediately preceding reservation" means a reservation (not a tentative reservation) whose finish time of the finish process is nearest to the start time of the partial schedule. The "immediately following reservation" means a reservation (not a tentative reservation) whose start time of the start process is nearest to the finish time of the partial schedule.

When there exists the "operation" of another reservation in the step S5305 or when the judgment result is "reservation impossible" in the step S5340 or S5390, the judgment result of the logical server tentative reservation is set to "impossible" (S5394). In this case, the contents of the flag buffers #1 and #2 are deleted, and records that have been added to the flag table 432 in the steps S5310 and S5360 using the tentative reservation ID employed in the step S3090 as the reservation ID 432a are deleted (S5396).

Figure 20A:
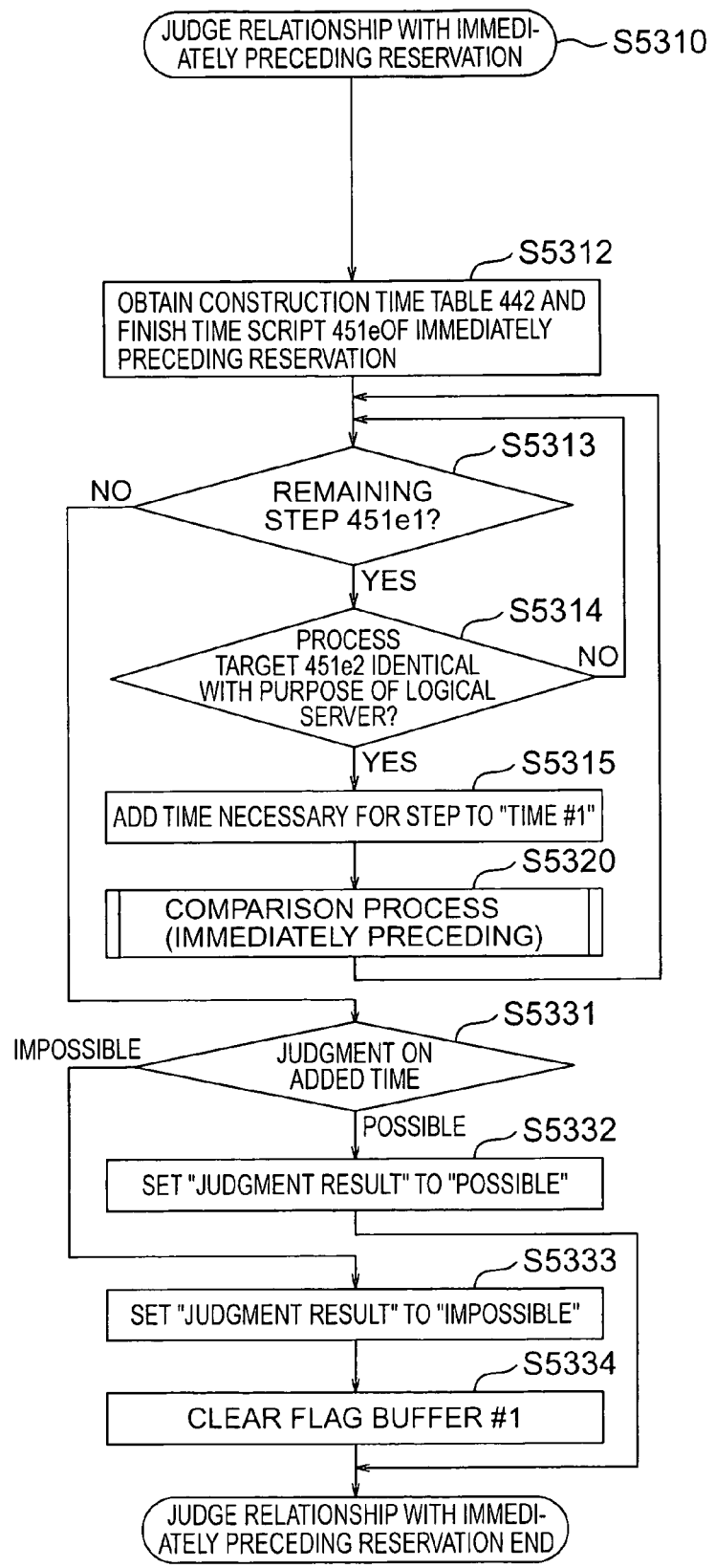
FIGS. 20A and 20B are flow charts showing the process flow of a step S5310 of the embodiment for judging the relationship with the immediately preceding reservation.
Figure 20B:
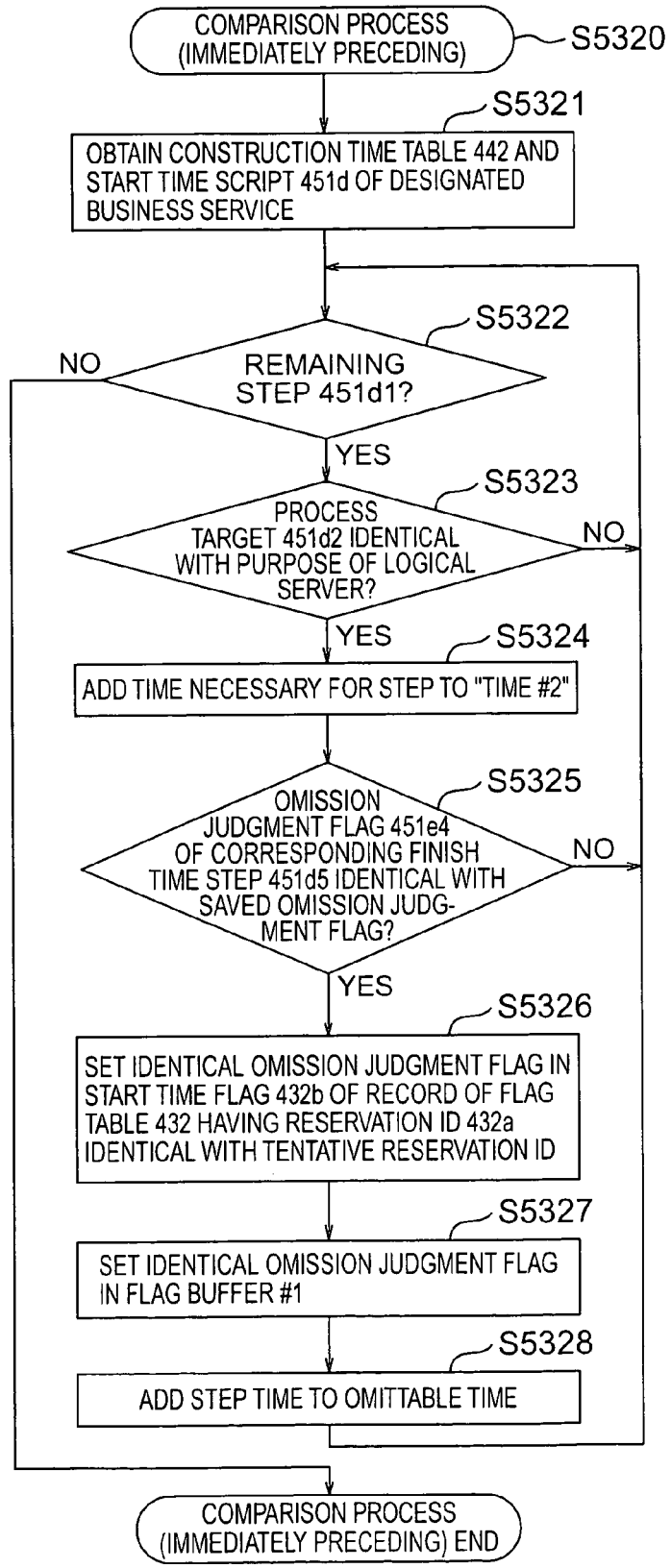

FIGS. 20A and 20B are flow charts showing the process flow of the step S5310 of this embodiment for judging the relationship with the immediately preceding reservation. As shown in FIGS. 20A and 20B, the step S5310 judges the possibility of reservation by examining the relationship between the contents of the tentative reservation (being made) and the immediately preceding reservation. In the process, when one or more steps of the start time script 451d can be omitted and the omission enables the reservation, the reservation possibility judgment is made omitting such steps as needed.

The reservation management processing unit 330 obtains the construction time table 442 and the finish time script 451e of the immediately preceding reservation by requesting them from the business configuration management processing unit 350 (S5312). For every step of the finish time script 451e (S5313), if the process target 451e2 is identical with the purpose of the logical server (YES in S5314), the "step time" of the step (time necessary for the step) is added to "TIME #1" (S5315), and the following comparison process (immediately preceding) is conducted (S5320). Incidentally, the "step time" is obtained from the construction time table 442 (ditto for the calculation of "TIME #2" and "OMITTABLE TIME" which will be explained below).

In the comparison process (immediately preceding) of the step S5320, the omission judgment flag 451e4 of the step of the finish time script 451e being handled in this process is saved first. Subsequently, the construction time table 442 and the start time script 451d of the reservation business service (for which the reservation of the logical server is being made in this process) are obtained by requesting them from the business configuration management processing unit 350 (S5321). For every step of the start time script 451d (S5322), if the process target 451d2 is identical with the purpose of the logical server (YES in S5323), the step time of the step is added to "TIME #2" (S5324), and the following steps are conducted.

First, the "corresponding finish time step 451d5" is referred to and the omission judgment flag 451e4 of the step (indicated by the "corresponding finish time step 451d5") of the finish time script 451e is obtained. Whether the omission judgment flag 451e4 is identical with the saved omission judgment flag or not is judged (S5325).

If the omission judgment flags are identical in the step S5325, the reservation management processing unit 330 sets the identical omission judgment flag in the start time flag 432b of a record of the flag table 432 having a reservation ID 432a identical with the tentative reservation ID employed in the step S3090 (S5326). The identical omission judgment flag is also set in the flag buffer #1 (S5327). The step time of the step having the identical omission judgment flag is added to the "OMITTABLE TIME" (S5328). If a suitable "record" does not exist in the step S5326, subsequent steps are carried out after inserting a new record.

After executing the step S5320 as above to all the steps of the finish time script 451e of the immediately preceding reservation, a calculation is made using the "OMITTABLE TIME", "TIME #1" and "TIME #2" (which have been added up) and "TIME #3" (between the finish time of the operation of the immediately preceding reservation and the start time of the partial schedule) as below (S5331):

TIME #3−(TIME#1+TIME#2−OMITTABLE TIME)    (1)

If the calculation is positive, the judgment result of the step S5310 (for judging the relationship with the immediately preceding reservation) is set to "possible" (S5332). If the calculation is negative, the judgment result of the step S5310 is set to "impossible" (S5333) and the contents of the flag buffer #1 is deleted (S5334).

Figure 21A:
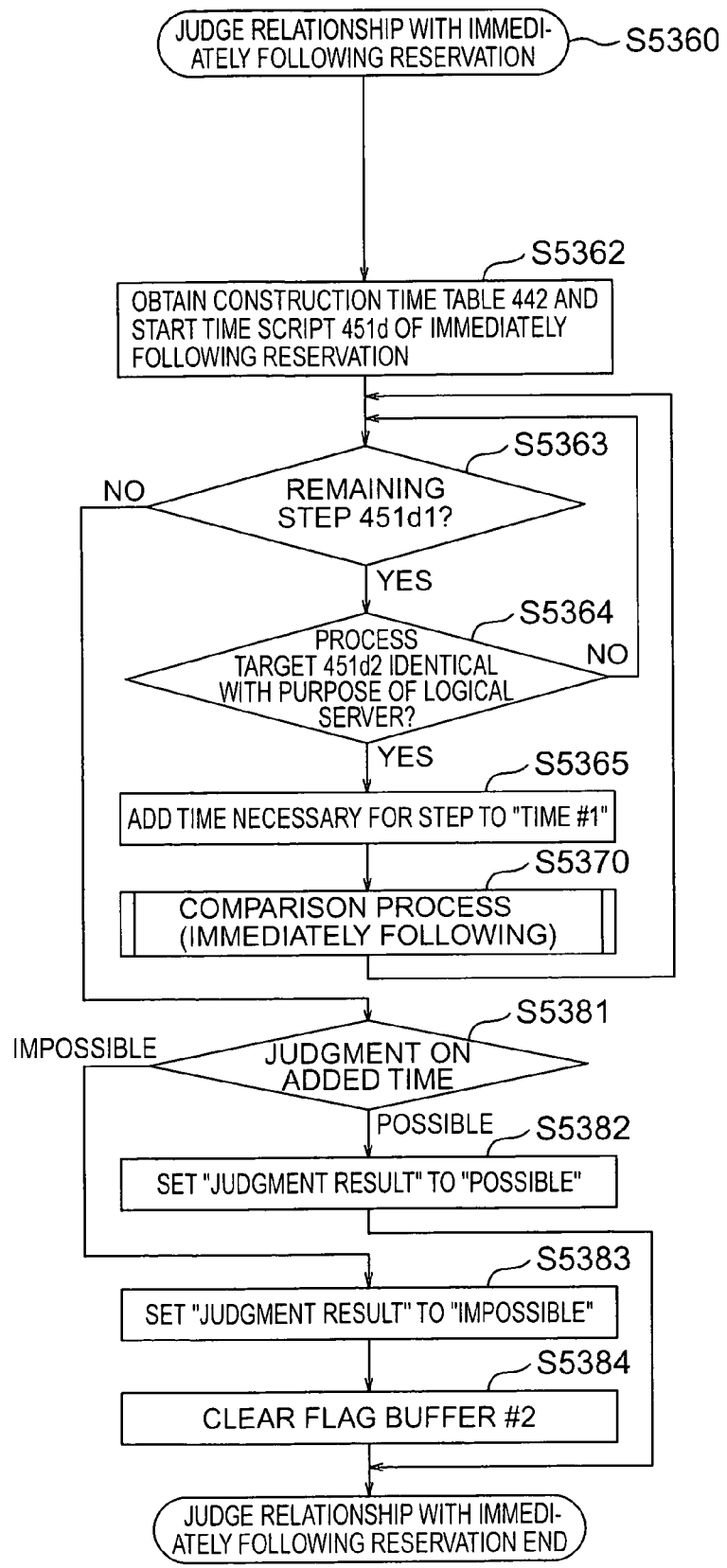
FIGS. 21A and 21B are flow charts showing the process flow of a step S5360 of the embodiment for judging the relationship with the immediately following reservation.
Figure 21B:
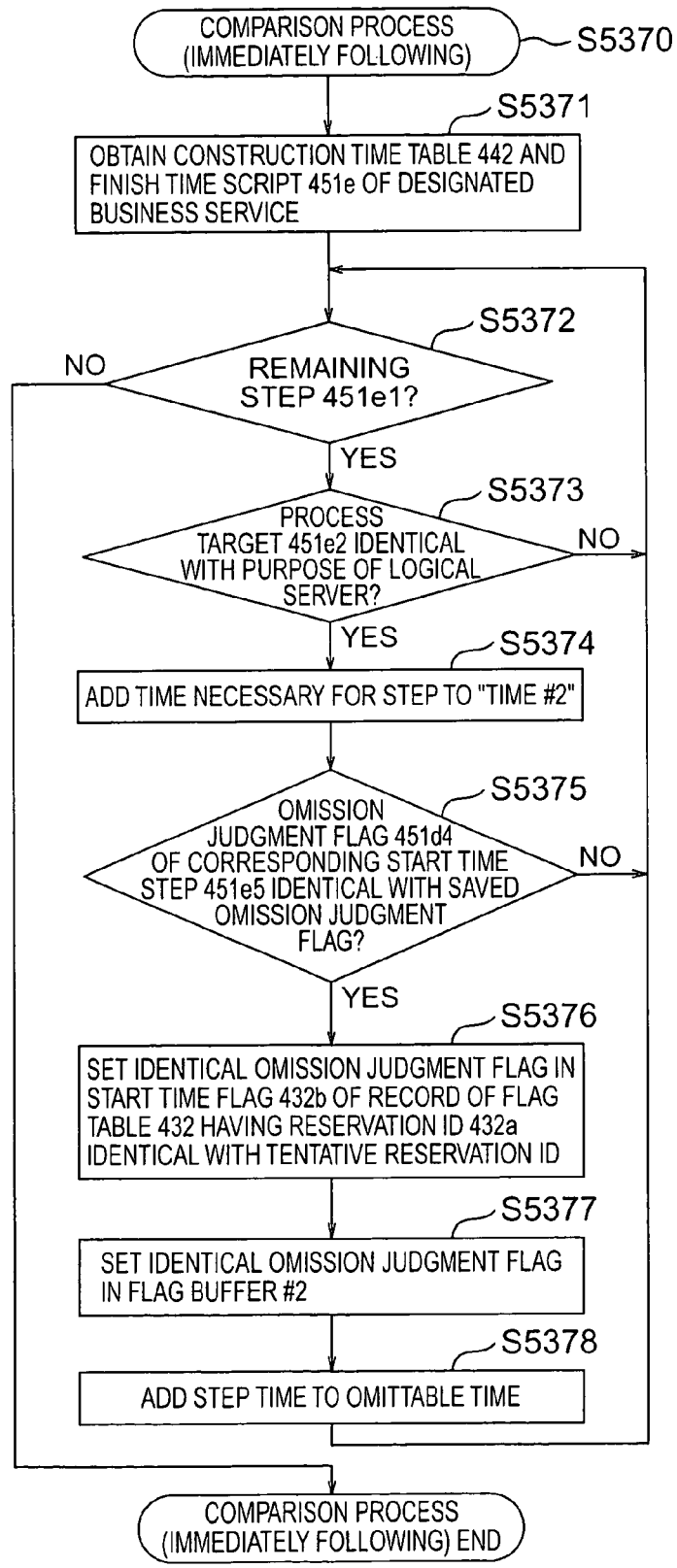

FIGS. 21A and 21B are flow charts showing the process flow of the step S5360 of this embodiment for judging the relationship with the immediately following reservation. As shown in FIGS. 21A and 21B, the step S5360 judges the possibility of reservation by examining the relationship between the contents of the tentative reservation (being made) and the immediately following reservation. If the reservation is possible, a tentative reservation is made using the tentative reservation ID employed in the step S3090. In the process, when one or more steps of the finish time script 451e can be omitted and the omission enables the reservation, the reservation possibility judgment is made omitting such steps as needed.

The details of the step S5360 (for judging the relationship with the immediately following reservation) are similar to those of the step S5310 (for judging the relationship with the immediately preceding reservation).

The reservation management processing unit 330 obtains the construction time table 442 and the start time script 451d of the immediately following reservation by requesting them from the business configuration management processing unit 350 (S5362). For every step of the start time script 451d (S5363), if the process target 451d2 is identical with the purpose of the logical server (YES in S5364), the "step time" of the step is added to "TIME #1" (S5365), and the following comparison process (immediately following) is conducted (S5370).

In the comparison process (immediately following) of the step S5370, the omission judgment flag 451d4 of the step of the start time script 451d being handled in this process is saved first. Subsequently, the construction time table 442 and the finish time script 451e of the reservation business service (for which the reservation of the logical server is being made in this process) are obtained by requesting them from the business configuration management processing unit 350 (S5371). For every step of the finish time script 451e (S5372), if the process target 451e2 is identical with the purpose of the logical server (YES in S5373), the step time of the step is added to "TIME #2" (S5374), and the following steps are conducted.

First, the "corresponding start time step 451e5" is referred to and the omission judgment flag 451d4 of the step (indicated by the "corresponding start time step 451e5") of the start time script 451d is obtained. Whether the omission judgment flag 451d4 is identical with the saved omission judgment flag or not is judged (S5375).

If the omission judgment flags are identical in the step S5375, the reservation management processing unit 330 sets the identical omission judgment flag in the start time flag 432b of a record of the flag table 432 having a reservation ID 432a identical with the tentative reservation ID employed in the step S3090 (S5376). The identical omission judgment flag is also set in the flag buffer #2 (S5377). The step time of the step having the identical omission judgment flag is added to "OMITTABLE TIME" (S5378). If a suitable "record" does not exist in the step S5376, subsequent steps are carried out after inserting a new record.

After executing the step S5370 as above to all the steps of the start time script 451d of the immediately following reservation, the aforementioned calculation (1) is done using the "OMITTABLE TIME", "TIME #1" and "TIME #2" (which have been added up) and "TIME #3" (between the finish time of the partial schedule and the start time of the operation of the immediately following reservation) (S5381). If the calculation is positive, the judgment result of the step S5360 (for judging the relationship with the immediately following reservation) is set to "possible" (S5382). If the calculation is negative, the judgment result of the step S5360 is set to "impossible" (S5383) and the contents of the flag buffer #2 is deleted (S5384).

FIG. 22 is a schematic diagram showing another example of the details of the start time script and the finish time script of the embodiment, in which "finish process omission 451e6" is added to the finish time script. Even when the tentative reservation is impossible due to impossibility of omitting a step in the above process, the reservation becomes possible if the omission of the step is judged to be possible in the following judgment using the "finish process omission 451e6". The indices set in the finish process omission 451e6 includes "step not omitted", "unconditional", and "no flag".

In the step S5310 for judging the relationship with the immediately preceding reservation, if the judgment result of the step S5331 is "impossible", a judgment described below is made for all the steps of the finish time script 451e of the reservation business service of the immediately preceding reservation. Similarly, in the step S5360 for judging the relationship with the immediately following reservation, if the result of the step S5381 is "impossible", the judgment described below is made for all the steps of the finish time script 451e of the business service (for which the reservation of the logical server is being made in this process). Thereafter, the judgment step S5331 (in the step S5310 for judging the relationship with the immediately preceding reservation) or the judgment step S5381 (in the step S5360 for judging the relationship with the immediately following reservation) is executed again.

(1) When the finish process omission 451e6 of the step (as the target of this process) is "step not omitted",
   (a) In the step S5310 for judging the relationship with the immediately preceding reservation, if the step indicated following the index "step not omitted:" of the finish process omission 451e6 has not won "YES" in the step S5325, the omission judgment flag 451e4 of the step (as the target of this process) is set in the flag buffer #1, and the step time of the step is added to the "OMITTABLE TIME".
   (b) In the step S5360 for judging the relationship with the immediately following reservation, if the step indicated following the index "step not omitted:" of the finish process omission 451e6 has not won "YES" in the step S5375, the omission judgment flag 451e4 of the step (as the target of this process) is set in the start time flag 432b of a record of the flag table 432 having a reservation ID 432a identical with the tentative reservation ID, and the step time of the step is added to the "OMITTABLE TIME".

The index "step not omitted" (step has not been omitted) means that a particular step is omitted when a step that can substitute for the particular step has not been omitted yet. For example, when the condition for omitting a step T013 is "T014 has not been omitted", the step T013 is regarded to be omittable when the step T014 has not been omitted yet. Taking an example from uninstalling, settings of an EJB component are unconditionally deleted when the EJB component is uninstalled. Therefore, the deletion of the settings is omitted if the uninstalling of the EJB component has not been omitted yet.

(2) When the finish process omission 451e6 of the step (as the target of this process) is "unconditional", (a) In the step S5310 for judging the relationship with the immediately preceding reservation, unconditionally, the omission judgment flag 451e4 of the step (as the target of this process) is set in the flag buffer #1, and the step time of the step is added to the "OMITTABLE TIME".

(b) In the step S5360 for judging the relationship with the immediately following reservation, unconditionally, the omission judgment flag 451e4 of the step (as the target of this process) is set in the start time flag 432b of a record of the flag table 432 having a reservation ID 432a identical with the tentative reservation ID, and the step time of the step is added to the "OMITTABLE TIME".

The index "unconditional" means that a particular step is omitted when omitting the particular step has no effect on already-reserved business services. For example, a step for uninstalling software is omitted unless the software has no effect on the immediately following business service, by which time necessary for the uninstallation is saved.

(3) When the finish process omission 451e6 of the step (as the target of this process) is "no flag", (a) In the step S5310 for judging the relationship with the immediately preceding reservation, if the start time script 451d of the reservation business service (for which the reservation of the logical server is being made in this process) does not include a step whose omission judgment flag 451d4 holds the flag indicated following the index ("no flag:") of the finish process omission 451e6, the omission judgment flag 451e4 of the step (as the target of this process) is set in the flag buffer #1, and the step time of the step is added to the "OMITTABLE TIME".

(b) In the step S5360 for judging the relationship with the immediately following reservation, if the start time script 451d of the reservation business service of the immediately following reservation does not include a step whose omission judgment flag 451d4 holds the flag indicated following the index ("no flag:") of the finish process omission 451e6, the omission judgment flag 451e4 of the step (as the target of this process) is set in the start time flag 432b of a record of the flag table 432 having a reservation ID 432a identical with the tentative reservation ID, and the step time of the step is added to the "OMITTABLE TIME".

For example, when the start time script 451d of the immediately following business service includes "no flag: EJB container * installation completion flag" (*: arbitrary letter), the uninstallation of the EJB container is regarded to be not omittable. The index "no flag" mainly assumes cases where a different software product of the same type or the same software of a different version is installed in the immediately following business service (where uninstallation can not be omitted in order to avoid conflict). Thus, although not unconditionally, the omission becomes possible in some cases depending on the contents of the immediately following business service.

While the aforementioned "omission" of a step (uninstallation, etc.) is employed on the assumption that each logical server has limitless HDD storage capacity and the step omission has no effect on the performance, it is also possible to introduce indices indicating the significance of the effect of the step omission on the performance, HDD free space, etc. and carry out the combination judgment process (S3000) taking the indices in consideration.

Figure 23:
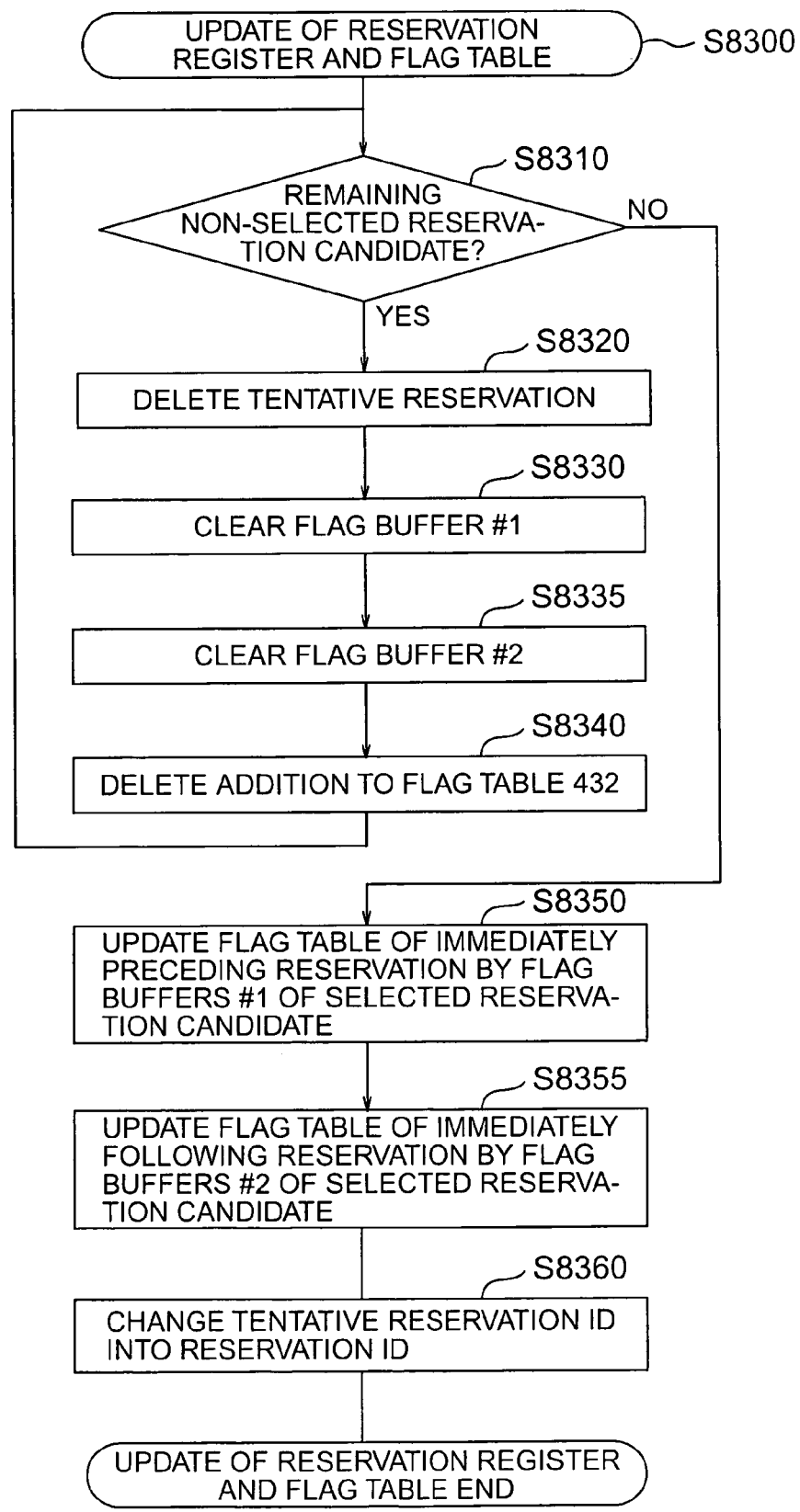
FIG. 23 is a flow chart showing the process flow of the update of a reservation register and a flag table (S8300) of the embodiment.

FIG. 23 is a flow chart showing the process flow of the update of the reservation register 431 and the flag table 432 (S8300) of this embodiment. As shown in FIG. 23, in the update of the reservation register 431 and the flag table 432 (S8300), necessary postprocessing is done for the reservation candidate selected in the step S8150 or S8200 of FIG. 16 and other reservation candidates.

The reservation management processing unit 330 first checks whether or not there exists a reservation candidate that was not selected (S8310). If YES, the tentative reservations made for all such reservation candidates (that were not selected) are deleted from the reservation register 431 (S8320). In other words, for all the logical servers included in such reservation candidates in the reservation register 431, the tentative reservations, having the tentative reservation ID employed in the step S3090, are deleted from the reservation register 431.

Subsequently, the flag buffers #1 and the flag buffers #2 of all the logical servers included in such reservation candidates are cleared (S8330, S8335), and records of the flag table 432 identified by the aforementioned tentative reservation ID are all deleted (S8340).

Meanwhile, if there exists no reservation candidate that was not selected (NO in S8310), the reservation management processing unit 330 updates the finish time flag 432c of the flag table 432 of the immediately preceding reservation of the logical server by the flag buffers #1 of all the logical servers of the selected reservation candidate (S8350), updates the start time flag 432b of the flag table 432 of the immediately following reservation of the logical server by the flag buffers #2 of all the logical servers of the selected reservation candidate (S8355), and changes the tentative reservation ID into a reservation ID (S8360).

In the load balancing system 300 of this embodiment, requests for reservations, the setting of the aforementioned selection method ("manual" or "automatic" for selecting one from the reservation candidates), the selection from the reservation candidates in the step S8200, the setting of the priority order of conditions used for the judgment of the steps S8150 and S5600 are inputted through the reservation management screen 133.

FIG. 24 is a schematic diagram showing the details of the selection from the reservation candidates (S8200) of this embodiment. In the step S8200, the business management client 200 displays a list of reservation candidates (whose tentative reservations have succeeded) on the reservation management screen 133 as shown in FIG. 24.

The "index 133b" (1-m) shown in FIG. 24 indicates each index 441c-1-441c-m (throughput, response time, etc.) of the measurement result table 441.

The "relationship with immediately preceding reservation 133c" indicates the information obtained in the step S5310, including:

(1) The sum 133c1 of the lengths of the time between the finish time of the immediately preceding reservation and the start time of the reservation request time, added up for all the logical servers included in the reservation candidate;

(2) The ratio 133c2 of [the number of logical servers with which the start process can be omitted] to [the total number of logical servers included in the reservation candidate]; and (3) The ratio 133c3 of [the number of logical servers with which the finish process of the immediately preceding reservation and the start process of the tentative reservation can totally be omitted] to [the total number of logical servers included in the reservation candidate].

The first information 133c1 indicates total idle time of logical servers as a result of the tentative reservation of each reservation candidate (that is, how short the logical server idle time will be by the tentative reservation of each reservation candidate). The second information 133c2 also indicates how short the logical server idle time will be by the tentative reservation; however, not as the total time but as the ratio of the number of logical servers. The third information 133c3 indicates the ratio of the number of particular logical servers (with which steps regarding the logical server can totally be omitted from the finish time steps of the immediately preceding reservation and from the start time steps of the tentative reservation). The "relationship with immediately preceding reservation 133c" may also indicate other types of information if obtained in the steps of the reservation process (combination of such information, calculation results using such combination, etc. are also possible). The "relationship with immediately following reservation 133d" indicates the information obtained in the step S5360, including:

(1) The sum 133d1 of the lengths of the time between the finish time of the reservation request time and the start time of the immediately following reservation, added up for all the logical servers included in the reservation candidate;

(2) The ratio 133d2 of [the number of logical servers with which the finish process can be omitted] to [the total number of logical servers included in the reservation candidate]; and (3) The ratio 133d3 of [the number of logical servers with which the start process of the immediately following reservation and the finish process of the tentative reservation can totally be omitted] to [the total number of logical servers included in the reservation candidate].

The "relationship with preceding/following reservations 133f" indicates the average of 133c and 133d. The "total cost 133g" indicates the sum of costs of the logical servers included in the reservation candidate, obtained from the server group table 411. The "purpose coincidence ratio 133e" indicates the average of two ratios: [the number of logical servers having the same purpose as the immediately preceding reservation]/[the total number of logical servers included in the reservation candidate] and [the number of logical servers having the same purpose as the immediately following reservation]/[the total number of logical servers included in the reservation candidate].

The reservation candidates 133a can be sorted in ascending/descending order based on the "index 133b", "relationship with immediately preceding reservation 133c", "relationship with immediately following reservation 133d", "relationship with preceding/following reservations 133f", "total cost 133g", or "purpose coincidence ratio 133e", by pressing or clicking a sort button. The order of sorting conditions is determined by the order of the sort buttons pressed or clicked. For example, when the sort buttons of the "relationship with immediately preceding reservation 133c" and "total cost 133g" are pressed in this order, the sorting is done primarily by the "total cost 133g" and secondarily by the "relationship with immediately preceding reservation 133c".

The system manager sorts the reservation candidates as above, selects an optimum reservation candidate, and presses or clicks a "decide" button, by which the reservation is settled (S8200).

Next, the setting of the priority order of conditions to be used for the judgment of the steps S8150 and S5600 will be explained. The "priority order of conditions" means a priority order given to the conditions: "index 133b", "relationship with immediately preceding reservation 133c", "relationship with immediately following reservation 133d", "relationship with preceding/following reservations 133f", "total cost 133g", and "purpose coincidence ratio 133e", to be used for the automatic selection in the steps S8150 and S5600. The priority order of conditions has to be set previously by the business manager through the reservation management screen 133.

As a default setting, the priority order of conditions may be like:

1. relationship with preceding/following reservations 133f3
2. relationship with preceding/following reservations 133f1
3. relationship with preceding/following reservations 133f2
4. total cost 133g
5. purpose coincidence ratio 133e
6. index 133b In the following, the reservation diversion process (S7000) of this embodiment will be explained. If the tentative reservation failed for all the reservation candidates in the candidate tentative reservation process of the step S4000 (NO in S6900 of FIG. 16), the reservation management processing unit 330 examines whether or not the reservation can be made possible by diverting another logical server (which has been reserved by another business service in the span of the partial schedule) into the reservation and assigning still another logical server to the (another) business service, and if the reservation becomes possible, makes the reservation.

To take a simple example, in order to carry out a reservation process for a business service #2 for a particular reservation request time under the following conditions:

[Condition 1] Business service #1: a logical server of a logical server group A has been reserved for the purpose "Web";

[Condition 2] Business service #2: a logical server of the logical server group A is necessary for the purpose "EJB"; and

[Condition 3] A logical server S1 (usable for only the purpose "Web") of a logical server group B is the only logical server available for the reservation request time, if the SLOs of the partial schedule of the business service #2 are satisfied also by the logical server S1 of the logical server group B, the reservation process can be completed by: canceling the reservation which has been made for the business service #1; making the reservation again with the logical server S1 of the logical server group B; and employing the logical server of the logical server group A (whose reservation for the business service #1 has been canceled) for the business service #2. Hereinafter, a business service (like the business service #2) for which a reservation in a particular partial schedule has failed will be referred to as a "diversion target business service".

Figure 25:
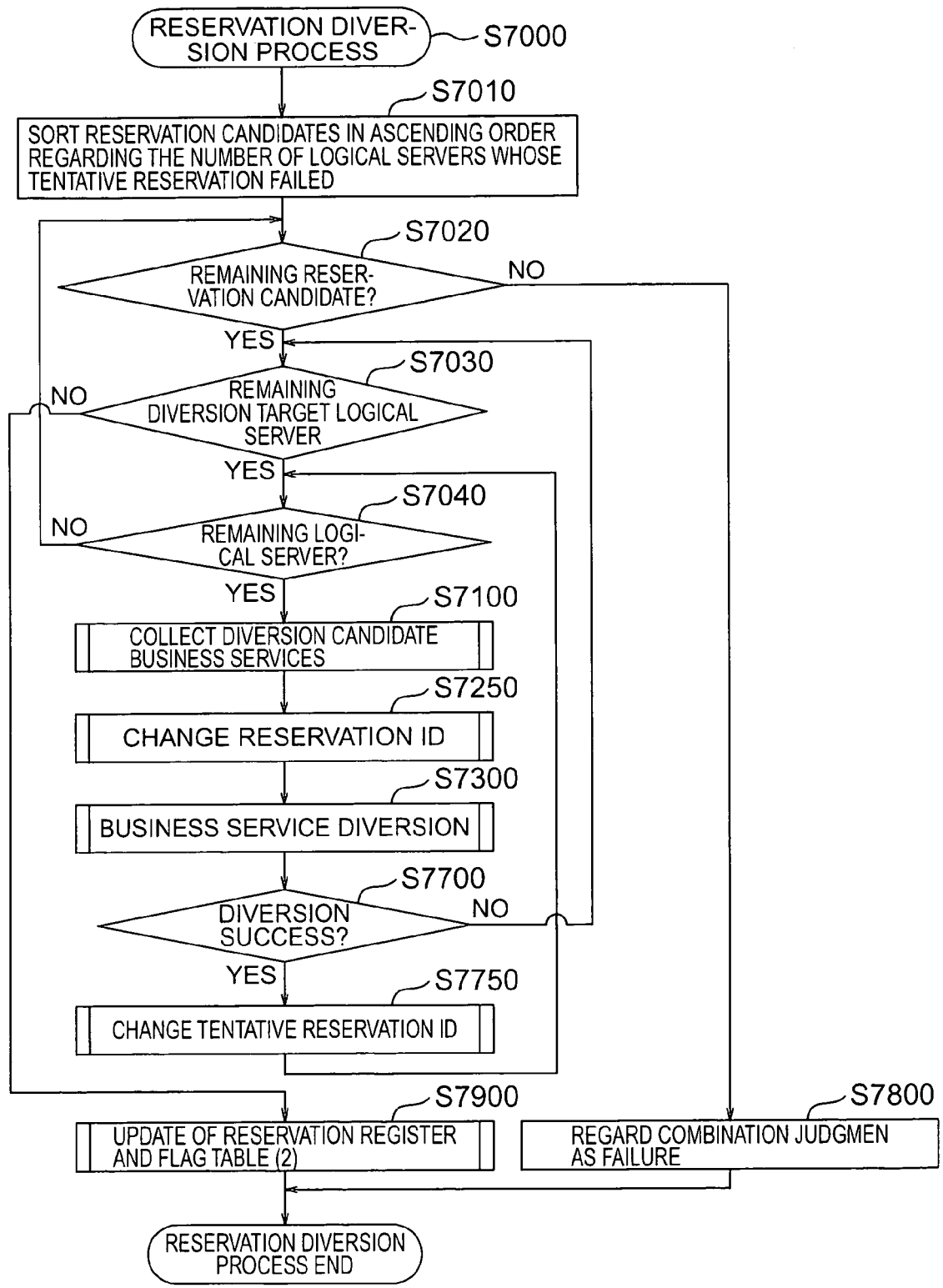
FIG. 25 is a flow chart showing the process flow of a reservation diversion process (S7000) of the embodiment.

FIG. 25 is a flow chart showing the process flow of the reservation diversion process (S7000) of this embodiment. As shown in FIG. 25, the reservation management processing unit 330 first sorts the reservation candidates in ascending order regarding the number of logical servers whose tentative reservation have failed (S7010). For each of the sorted reservation candidates (S7020), the reservation management processing unit 330 judges whether or not all the logical servers for which the reservation candidate failed the tentative reservation in the candidate tentative reservation process of the step S4000 (hereinafter, referred to as "diversion target logical servers") can be diverted from reservation business services that have already reserved them (hereinafter, referred to as "diversion candidate business services"), as follows.

First, for a first diversion target logical server (S7030), the reservation management processing unit 330 refers to the server table 413 and carries out the following process (1)-(3) for each logical server.

(1) Collect all reservation business services that have reserved the logical server during the reservation request time and regard them as the diversion candidate business services (S7100).
(2) Change the reservation IDs into tentative reservation IDs for all the diversion candidate business services (S7250).
(3) Judge whether or not it is possible to cancel the reservation of the logical server and assign the reservation another reservation candidate, for all the diversion candidate business services (S7300).

If the diversion succeeded for all the diversion candidate business services in the step S7300 (YES in S7700), the process returns to the step S7030 and the process (1)-(3) is repeated for the next diversion target logical server.

Meanwhile, if the diversion failed for at least one of the diversion candidate business services (NO in S7700), the tentative reservation IDs regarding all the diversion candidate business services are returned to the reservation IDs (S7750), and the process from the step S7040 is executed again for the next reservation candidate (with the second smallest number of logical servers whose tentative reservation have failed).

When there remains no logical server in the step S7030 and the diversion has succeeded for all the diversion target logical servers (NO in S7030) the process proceeds to step S7900, in which the reservation candidate is regarded to be capable of the diversion, and the reservation register 431 and the flag table 432 are updated. In this case, the combination judgment process (S3000) of FIG. 16 is completed without executing the steps S8000 through S8300.

On the other hand, when there remains no reservation candidate in the step S7020 and the diversion failed for all the reservation candidates (NO in S7020), the process proceeds to step S7800, in which the combination judgment is regarded to have failed, and the system manager and the business manager are informed of the failure (S9050).

Figure 26:
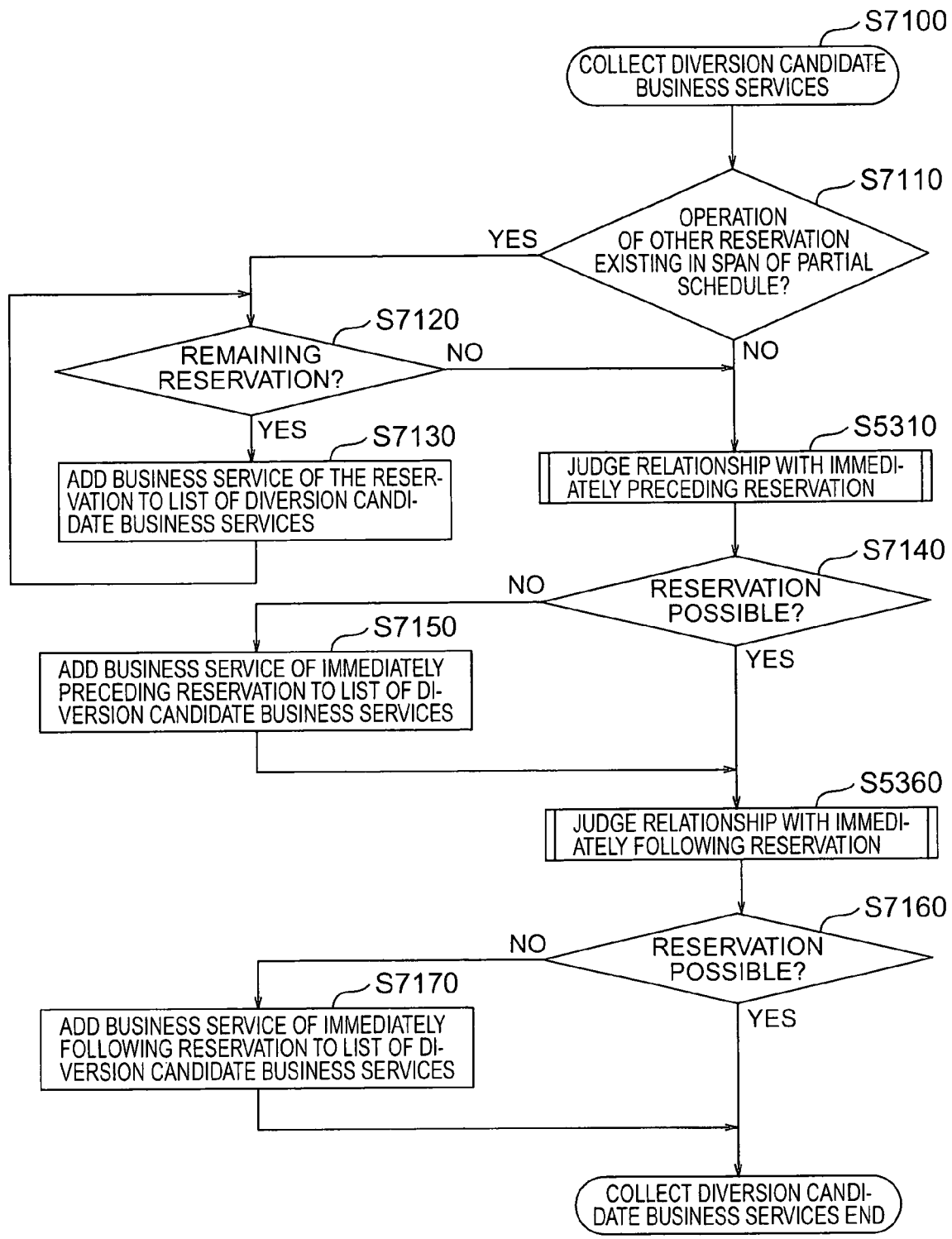
FIG. 26 is a flow chart showing the process flow of a diversion candidate business service collection process (S7100) of the embodiment.

FIG. 26 is a flow chart showing the process flow of the diversion candidate business service collection process (S7100) of this embodiment. First, whether or not there exist one or more operations of other reservations in the span of the partial schedule is judged (S7110). If YES, the business services regarding such reservations are added to the list of the diversion candidate business services (S7120, S7130).

Subsequently, the relationship with the immediately preceding reservation is judged (S5310). If the judgment indicates that the reservation is impossible (NO in S7140), the reservation business service of the immediately preceding reservation is added to the list of the diversion candidate business services (S7150).

Further, the relationship with the immediately following reservation is judged (S5360), and if the judgment indicates that the reservation is impossible (NO in S7160), the reservation business service of the immediately following reservation is added to the list of the diversion candidate business services (S7170).

Figure 27:
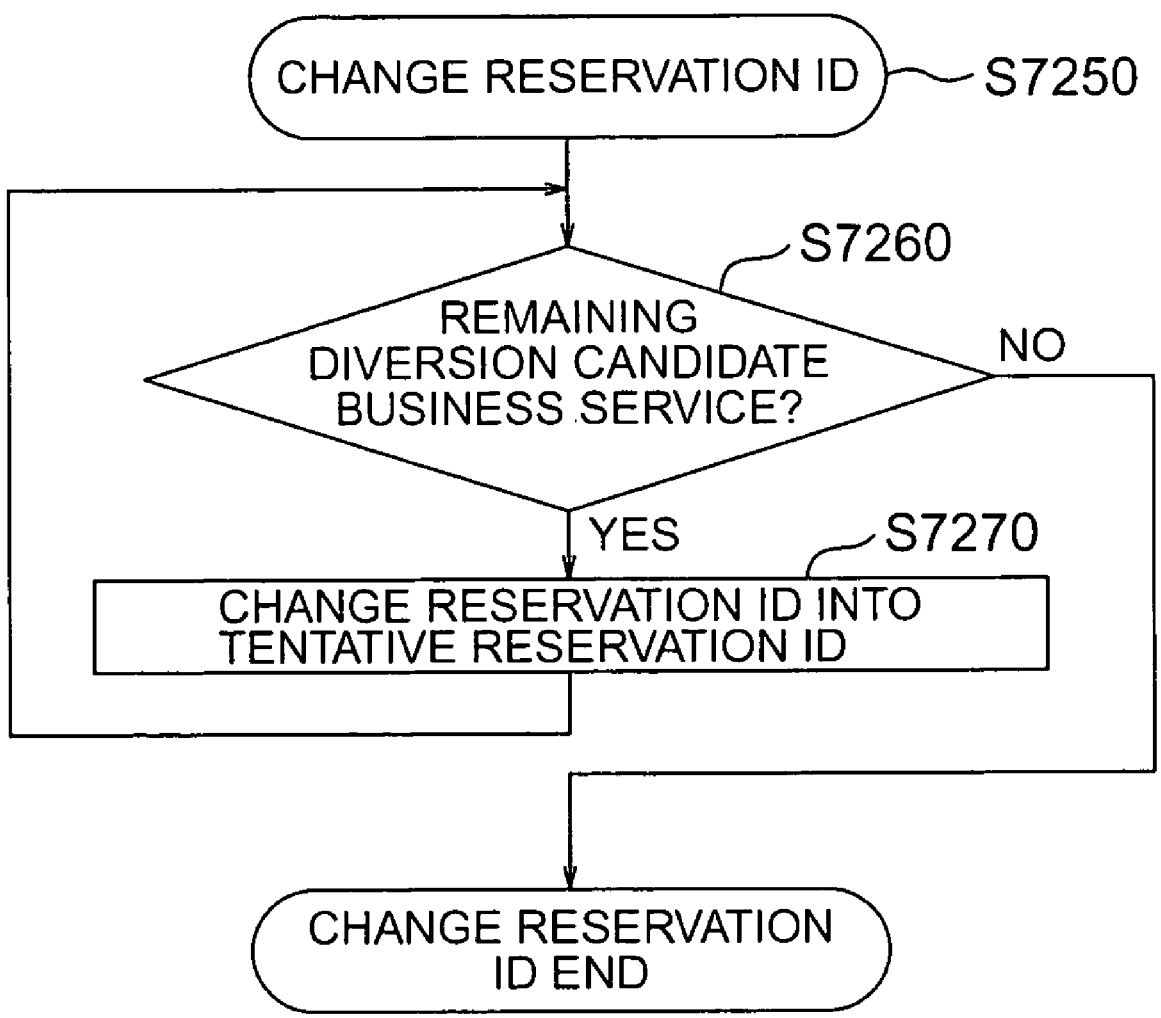
FIG. 27 is a flow chart showing the process flow of a reservation ID changing process (S7250) of the embodiment.

FIG. 27 is a flow chart showing the process flow of the reservation ID changing process (S7250) of this embodiment. In the reservation ID changing process (S7250), after reading out the reservation ID of each diversion candidate business service and storing it in memory, the reservation ID is changed into a tentative reservation ID (S7270).

Figure 28:
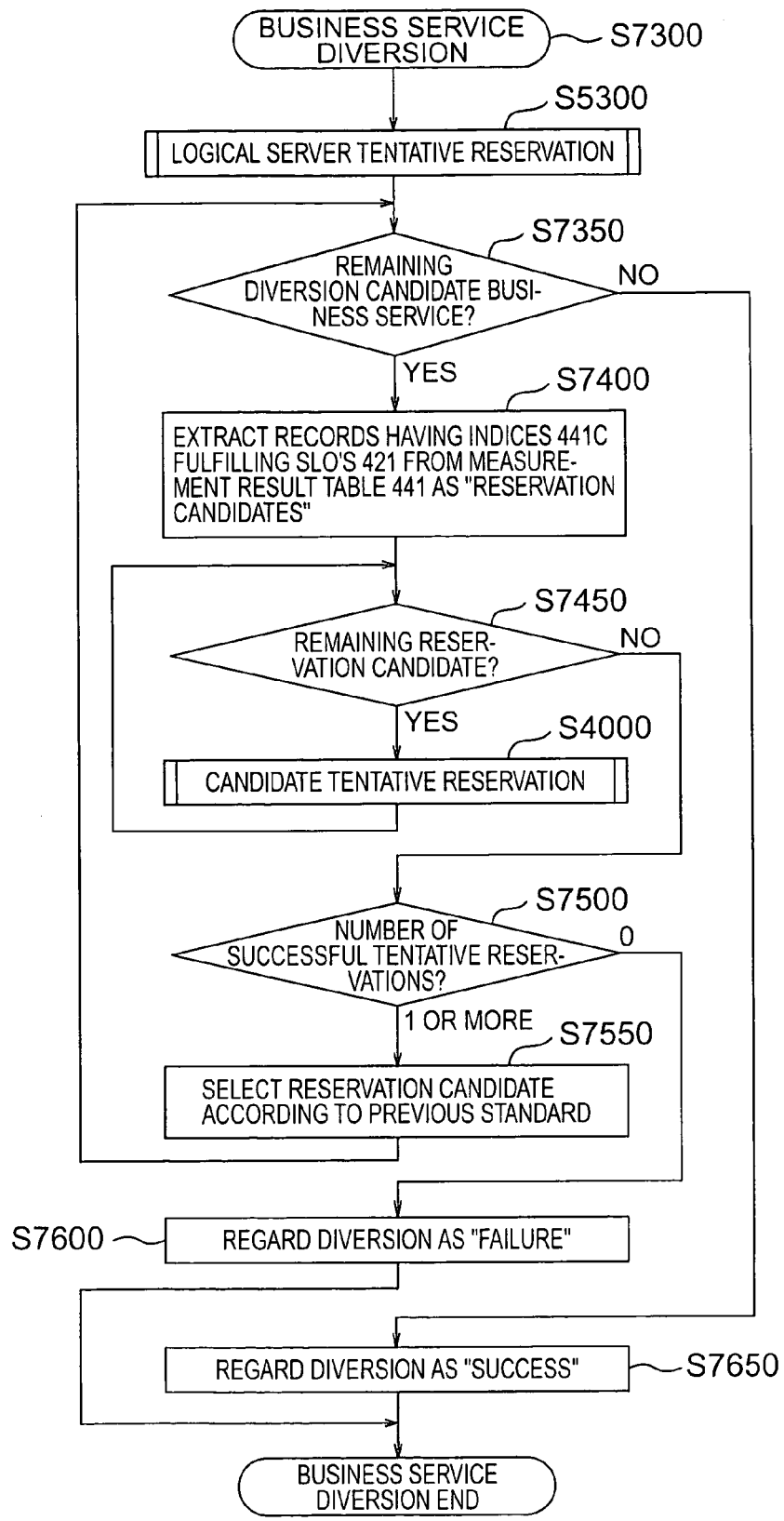
FIG. 28 is a flow chart showing the process flow of a business service diversion process (S7300) of the embodiment.

FIG. 28 is a flow chart showing the process flow of the business service diversion process (S7300) of this embodiment. In the business service diversion process (S7300) of FIG. 28, the candidate tentative reservation process (S4000) is executed again for each diversion candidate business service, and if there exists a reservation candidate that does not use the diversion target logical server (as the target of this process), the reservation of the diversion candidate business service is replaced with the reservation candidate and thereby the reservation of the diversion target logical server is made possible at least throughout the reservation request time.

The reservation management processing unit 330 first makes a tentative reservation of the diversion target logical server using the reservation ID of the diversion target business service in the partial schedule (S5300).

Subsequently, for every diversion candidate business services (S7350), records having indices 441c fulfilling the SLOs 421 in the partial schedule are extracted from the measurement result table 441 of the diversion candidate business service, and the extracted records are regarded as "reservation candidates" (S7400).

Subsequently, for each of the reservation candidates (S7450), the candidate tentative reservation process (S4000) is carried out. If the tentative reservation succeeded for one or more reservation candidates ("1 or more" in S7500), a reservation candidate is selected from the reservation candidates according to the previous selection standard (employed for the reservation of the diversion candidate business service) (S7550). If the number of selectable reservation candidates (successful tentative reservations) is 0 ("0" in S7500) for at least one of the diversion candidate business services, the diversion is regarded as failure (S7600).

If there remains no diversion candidate business service in the step S7350, that is, if the selection of the reservation candidate succeeded for all the diversion candidate business services, the diversion is regarded as success (S7650).

The reservation management processing unit 330 also executes the reservation cancellation process (reservation deletion process), in which the reservation schedules regarding the reservation corresponding to the cancellation request are all deleted from the reservation register 431, and a record identified by the reservation ID of the canceled reservation is deleted from the flag table 432. As is clear from the reservation process, the reservation diversion process and the reservation deletion process which have been explained above, canceling a reservation of a particular logical server during a particular time period by designating the particular logical server and the particular time period, canceling a reservation of a particular business service by designating the particular business service, canceling reservations regarding a particular logical server by designating the particular logical server and thereafter making re-reservation for all the business services that had reserved the particular logical server at the point of cancellation, etc. are also possible.

Figure 29:
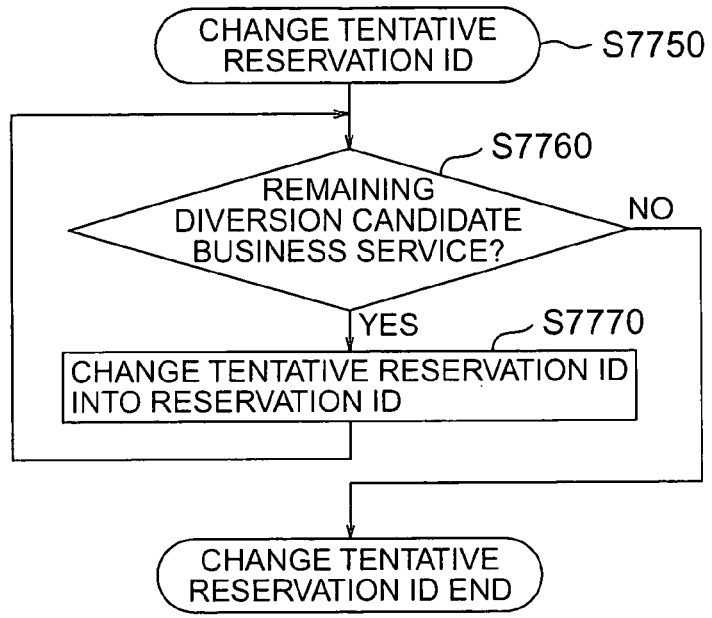
FIG. 29 is a flow chart showing the process flow of a tentative reservation ID changing process (S7750) of the embodiment.

FIG. 29 is a flow chart showing the process flow of the tentative reservation ID changing process (S7750) of this embodiment. In the tentative reservation ID changing process (S7750), the reservation ID of each diversion candidate business service which has been stored in memory is read out and written over the tentative reservation ID of the diversion candidate business service, by which the tentative reservation ID of each diversion candidate business service is returned to the reservation ID.

Figure 30:
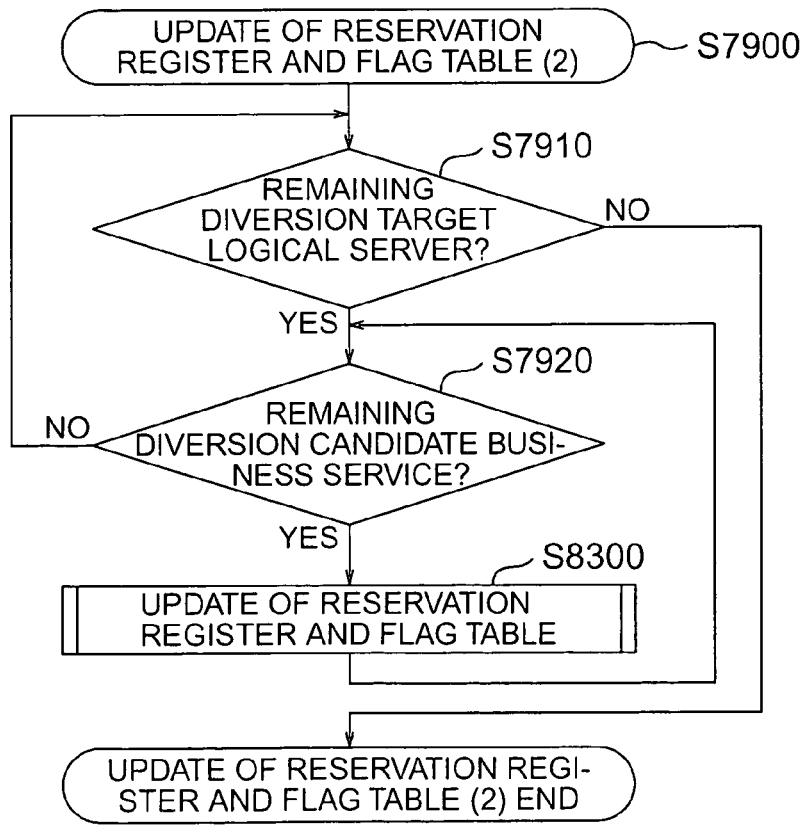
FIG. 30 is a flow chart showing the process flow of the update of the reservation register and the flag table (S7900) of the embodiment.

FIG. 30 is a flow chart showing the process flow of the update of the reservation register and the flag table (S7900) of this embodiment. In the update process of the step S7900, the "update of reservation register and flag table" of the step S8300 is carried out regarding each diversion target logical server and each diversion candidate business service.

In the following, a process carried out by the system construction processing unit 360 of this embodiment will be explained.

Figure 31:
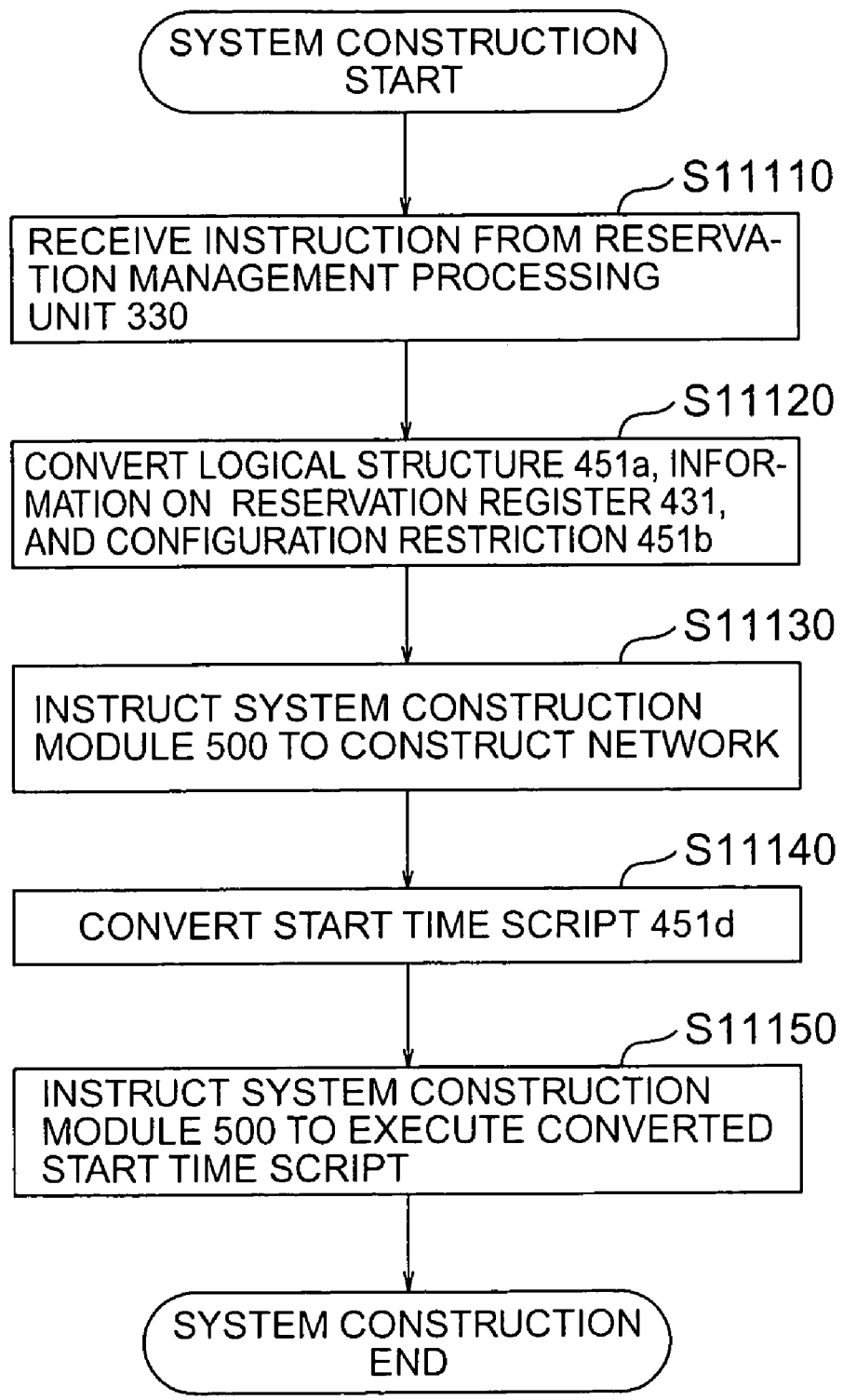
FIG. 31 is a flow chart showing the process flow of a system construction process of the embodiment.

FIG. 31 is a flow chart showing the process flow of a system construction process of this embodiment. When a reservation start instruction is supplied from the reservation management processing unit 330 (S11110), the system construction processing unit 360 converts the logical structure 451*a* of the reservation business service of the reservation, the information (stored in the reservation register 431) on logical servers to be actually assigned to the logical structure 451*a*, and the configuration restriction 451*b* into a format that can be recognized by the system construction module 500 (S11120), and instructs the system construction module 500 to construct the system or network (S11130).

Subsequently, the system construction processing unit 360 refers to the flag table 432, omits the omittable steps from the start time script 451*d*, embeds the information on the logical servers to be actually assigned (stored in the reservation register 431) in the script, converts the script into the format that can be recognized by the system construction module 500 (S11140), and instructs the system construction module 500 to execute the converted start time script (S11150).

Figure 32:
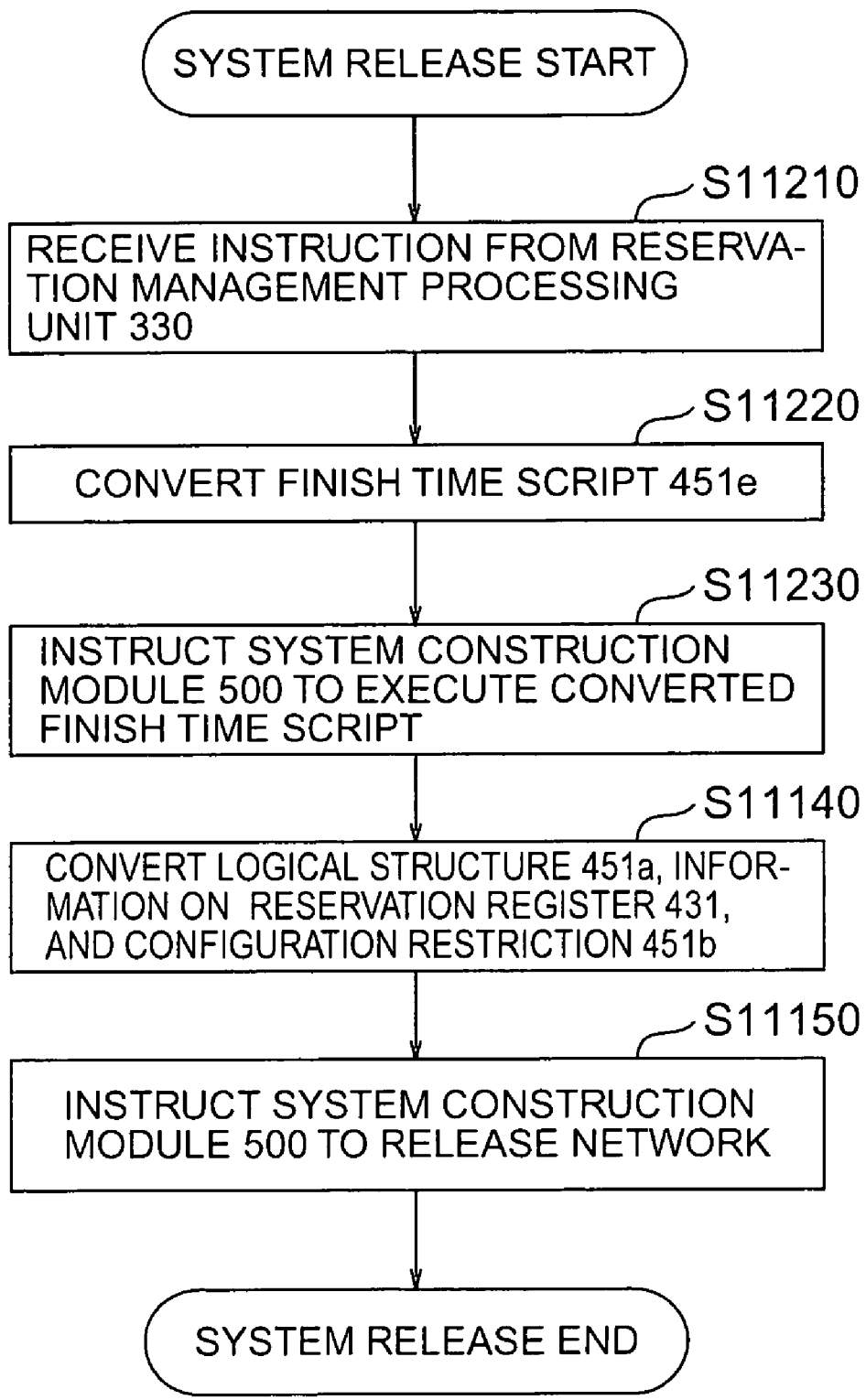
FIG. 32 is a flow chart showing the process flow of a system release process of the embodiment.

FIG. 32 is a flow chart showing the process flow of a system release process of this embodiment. Similarly to the above system construction process, when a reservation finish instruction is supplied from the reservation management processing unit 330 (S11210), the system construction processing unit 360 refers to the flag table 432, omits the omittable steps from the finish time script 451*e* of the reservation business service of the reservation, embeds the information on the logical servers to be actually assigned (stored in the reservation register 431) in the script, converts the script into the format that can be recognized by the system construction module 500 (S11220), and instructs the system construction module 500 to execute the converted finish time script (S11230).

Subsequently, the system construction processing unit 360 converts the logical structure 451*a*, the information on logical servers to be actually assigned (stored in the reservation register 431), and the configuration restriction 451*b* into a format that can be recognized by the system construction module 500 (S11240), and instructs the system construction module 500 to release the system or network (S11250).

Further, the system construction processing unit 360 constantly monitors the system construction module 500 during the reservation start process and the reservation finish process and thereby updates the construction time table 442. Similarly, during the operation of the reservation, the system construction processing unit 360 constantly monitors the system construction module 500 and thereby updates the measurement result table 441.

As described above, by the load balancing system in accordance with the embodiment of the present invention, the load balancing of business service is carried out by partitioning the schedule of the designated service into a plurality of partial schedules based on the SLOs and assigning each of the partial schedules information processors that satisfy the SLOs. Therefore, it becomes possible to dynamically construct partitions fulfilling the agreements on service quality and assign idle information processors (that have become idle depending on the type of business and the time of day) to other business services.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A load balancing method executed in a system having a storage and a plurality of information processing modules that can be shared among business services, comprising the steps of:

registering a business configuration definition of each business service including a schedule of a corresponding business service in a business configuration management repository of said storage by a configuration unit of said system;

storing a service level objective of each business service in a service-level-objective table of said storage by a service-level-objective unit of said system;

storing information on performance of each of said plurality of information processing modules in a performance management table of said storage by said configuration unit;

receiving a designation of a business service and reading the schedule of a designated business service from the business configuration definition registered with the business configuration management repository by a reservation unit of said system;

acquiring from said service-level-objective unit the stored service level objective of the designated business service by said reservation unit;

partitioning the schedule of the designated business service read from the business configuration definition into a plurality of partial schedules according to the acquired service level objective by said reservation unit;

registering performance information for the plurality of information processing modules in a performance management table of said storage, respectively;

registering in advance judgment information indicating contents of the start process and finish process of the plurality of partial schedules of each business service in the business configuration management repository;

using a processor, comparing the judgment information of an already-reserved business service with the judgment information of the designated business service, and thereby selecting one or more information processing modules of said plurality of information processing modules whose performance information stored in the performance management table satisfies the service level objective in each partial schedule, reserving the information processing modules selected satisfying the service level objective in the partial schedules as information processing modules for executing the designated business service in the schedule in said storage, and omitting a step in a start process or finish process of the designated business service that coincides with a step of a business service that has already been reserved with the information processing module; and executing the designated business service with the plurality of information processing modules reserved in the receiving step.

2. The load balancing method according to claim 1, wherein the partitioning of the schedule read from the business configuration definition by said reservation unit is conducted in units of spans in each of which the service level objective remains constant.

3. The load balancing method according to claim 1, wherein the reservation of the information processing modules for executing the designated business service in said storage is made by omitting a particular step in a start process or finish process of the designated business service when a step capable of substituting for the particular step has not been omitted.

4. The load balancing method according to claim 1, wherein the reservation of the information processing modules for executing the designated business service in said storage is made by omitting a particular step in a start process or finish process of the designated business service when the omission of the particular step has no effect on already-reserved business services.

5. The load balancing method according to claim 1, wherein the reservation of the information processing modules for executing the designated business service is made avoiding omission of a particular step under processing of the designated business service to make the reservation omitting the particular step when the reservation is made possible.

6. The load balancing method according to claim 1, wherein diversion information indicating that an information processing module that has already been reserved by another business service is diverted into the designated business service is stored in said storage when it is impossible to fully reserve the information processing modules for executing the designated business service.

7. A load balancing system comprising:
a business configuration management processing unit which registers a business configuration definition of each business service including a schedule of the business service with a business configuration management repository;
a service-level-objective management processing unit which stores at least a service level objective of each business service in a service-level-objective management table;
a performance management processing unit which stores information on performance of each of a plurality of information processing modules in a performance management table; and
a reservation management processing unit connected with the business configuration management processing unit, the service-level-objective management processing unit, and the performance management processing unit, wherein the reservation management processing unit receives a designation of a business service and reads the schedule of a designated business service from the business configuration definition registered with the business configuration management repository, acquires from said service-level-objective unit the stored service level objective of the designated business service, partitions the schedule of the designated business service read from the business configuration definition into a plurality of partial schedules according to the acquired service level objective, registers performance information for the plurality of information processing modules in a performance management table of said storage, respectively, registers in advance the business configuration definition that includes flag information indicating contents of the start process and finish process of the plurality of partial schedules of each business service with the business configuration management repository, compares the flag information of an already-reserved business service with the flag information of the designated business service, selects one or more information processing modules of said plurality of information processing modules whose performance information stored in the performance management table satisfies the service level objective in each partial schedule, reserves the information processing modules selected for the partial schedules as information processing modules for executing the designated business service in the schedule, and omits a step in a start process or finish process of the designated business service that coincides with a step of a business service that has already been reserved with the information processing module,
wherein the plurality of information processing modules reserved execute the designated business service.

8. The load balancing system according to claim 7, wherein the reservation management processing unit conducts the partitioning of the schedule in units of spans in each of which the service level objective remains constant.

9. The load balancing system according to claim 7, wherein the reservation management processing unit makes the reservation of the information processing modules for executing the designated business service by omitting a particular step in a start process or finish process of the designated business service when a step capable of substituting for the particular step has not been omitted.

10. The load balancing system according to claim 7, wherein the reservation management processing unit makes the reservation of the information processing modules for executing the designated business service by omitting a particular step in a start process or finish process of the designated business service when the omission of the particular step has no effect on already-reserved business services.

11. The load balancing system according to claim 7, wherein the reservation management processing unit makes the reservation of the information processing modules for executing the designated business service avoiding omission of a particular step under processing of the designated business service to make the reservation omitting the particular step when the reservation is made possible.

12. A computer readable storage medium embedded with a program for instructing a computer in a system having a storage and a plurality of information processing modules that can be shared among business services, the program, when executed, causing the computer to function as:
a business configuration management processing unit which registers a business configuration definition of each business service including a schedule of a corresponding business service with a business configuration management repository;
a service-level-objective management processing unit which stores at least a service level objective of each business service in a service-level-objective management table;
a performance management processing unit which stores information on performance of each of said plurality of information processing modules in a performance management table; and
a reservation management processing unit which receives a designation of a business service and reads the schedule of a designated business service from the business configuration definition registered with the business configuration management repository, acquires from said service-level-objective unit the stored service level objective of the designated business service, partitions the schedule of the designated business service read from the business configuration definition into a plurality of partial schedules according to the acquired service level objective, registers performance information for the plurality of information processing modules in a performance management table of said storage, respectively, registers in advance the business configuration definition that includes flag information indicating contents of the start process and finish process of the plurality of partial schedules of each business service with the business configuration management repository, compares the flag information of an already-reserved business service with the flag information of the designated business service, selects one or more information processing modules whose performance information stored in the performance management table satisfies the service level objective in each partial schedule, reserves the information processing modules selected for the partial schedules as information processing modules for executing the designated business service in the schedule, and omits a step in a start process or finish process of the designated business service that coincides with a step of a business service that has already been reserved with the information processing module, wherein the plurality of information processing modules reserved execute the designated business service.

13. The computer readable storage medium according to claim 12, wherein the reservation management processing unit conducts the partitioning of the schedule in units of spans in each of which the service level objective remains constant.

14. The computer readable storage medium according to claim 12, wherein the reservation management processing unit realizes the omission by:

registering in advance the business configuration definition that includes flag information indicating contents of the start process and finish process of each business service with the business configuration management repository, and comparing the flag information of the already-reserved business service with the flag information of the designated business service.

15. The computer readable storage medium according to claim 12, wherein the reservation management processing unit makes the reservation of the information processing modules for executing the designated business service by omitting a particular step in a start process or finish process of the designated business service when a step capable of substituting for the particular step has not been omitted.

16. The computer readable storage medium according to claim 12, wherein the reservation management processing unit makes the reservation of the information processing modules for executing the designated business service by omitting a particular step in a start process or finish process of the designated business service when the omission of the particular step has no effect on already-reserved business services.

17. The computer readable storage medium according to claim 12, wherein the reservation management processing unit makes the reservation of the information processing modules for executing the designated business service avoiding omission of a particular step under processing of the designated business service to make the reservation omitting the particular step when the reservation is made possible.

* * * * *